(12) United States Patent
Perry

(10) Patent No.: US 11,732,922 B2
(45) Date of Patent: Aug. 22, 2023

(54) ONE PIPE OR TWO PIPE FLUE GAS AND COMBUSTION AIR SYSTEM

(71) Applicant: Shawn F D Perry, Winnipeg (CA)

(72) Inventor: Shawn F D Perry, Winnipeg (CA)

(*) Notice: Subject to any disclaimer, the term of this patent is extended or adjusted under 35 U.S.C. 154(b) by 442 days.

(21) Appl. No.: 16/870,875

(22) Filed: May 8, 2020

(65) Prior Publication Data

US 2021/0348798 A1 Nov. 11, 2021

(51) Int. Cl.
*F24F 13/02* (2006.01)
*F24F 13/08* (2006.01)
*F24F 13/20* (2006.01)
*F24F 7/00* (2021.01)

(52) U.S. Cl.
CPC ........ *F24F 13/0227* (2013.01); *F24F 13/084* (2013.01); *F24F 2007/0025* (2021.01)

(58) Field of Classification Search
CPC .................. F24F 13/084; F24F 13/0227; F24F 2007/0025
USPC ........................................ 126/80, 307 A, 312
See application file for complete search history.

(56) References Cited

U.S. PATENT DOCUMENTS

| | | | | |
|---|---|---|---|---|
| 3,220,079 A * | 11/1965 | Aggson | ................. | E04B 1/7076 454/271 |
| 5,062,354 A * | 11/1991 | Goins | ..................... | F23L 17/04 126/307 A |
| 5,165,453 A * | 11/1992 | Walker, Jr. | ........... | H02G 3/0608 138/104 |
| 5,341,767 A * | 8/1994 | Smith | ....................... | F23C 7/00 122/13.01 |
| 6,083,098 A * | 7/2000 | Sotoda | ................... | F23J 13/025 122/13.01 |
| 6,289,886 B1 * | 9/2001 | Radke | ..................... | F23L 17/04 126/307 A |
| 7,717,702 B2 * | 5/2010 | Aycock | .................... | F23J 11/06 126/116 A |
| 7,896,399 B1 * | 3/2011 | Orsini | ..................... | F16L 55/18 24/19 |
| 8,011,359 B1 * | 9/2011 | Schultz | ............... | F24C 15/2042 126/550 |

(Continued)

OTHER PUBLICATIONS https://terrylove.com/forums/index.php?threads/hot-water-heater-intake-vent-collecting-frost-plumber-says-its-normal.56120/ (Year: 2014).*

(Continued)

*Primary Examiner* — Ko-Wei Lin
(74) *Attorney, Agent, or Firm* — Christopher J. Dynowski; Ryan W. Dupuis; Ade & Company Inc.

(57) ABSTRACT

The invention non-direct vent (one pipe) or direct vent (two pipe) fuel fired appliance vent terminations spaced apart to accommodate the inward flow of combustion air and/or the outwardly flow of exhaust flue gas of a fuel fired appliance. The vent termination ends are capable of engaging the terminal ends of a variety of different size exhaust conduits including fitting sockets of a conduit fitting. The vent pipe termination can include in some aspects a vent pipe termination kit which may include, but not limited to; a vent termination main embodiment, mounting plate, screws, connector elements, threaded nuts, connector element cover, protection shield, intake screen, 90 degree elbows, sloped vent fitting, T fittings, wall anchors, decals or labels, escutcheon covers, insulating materials, caulking or other similar components.

33 Claims, 12 Drawing Sheets

(56) References Cited

U.S. PATENT DOCUMENTS

| | | | | |
|---|---|---|---|---|
| 8,327,836 | B2* | 12/2012 | Brown | F23L 17/04 126/307 A |
| 8,496,515 | B2* | 7/2013 | Bailey | F04D 29/701 454/341 |
| 9,784,447 | B1* | 10/2017 | Ohunna, II | F23J 11/00 |
| 9,932,106 | B1* | 4/2018 | Gardiner | B64C 3/187 |
| 10,989,437 | B1* | 4/2021 | Dolan | F24F 13/082 |
| 2006/0205336 | A1* | 9/2006 | Brunt | F23J 13/04 29/890.03 |
| 2008/0271726 | A1* | 11/2008 | Jacklich | F24C 15/002 126/80 |
| 2009/0270024 | A1* | 10/2009 | Buck | F24F 13/082 209/280 |
| 2010/0089382 | A1* | 4/2010 | Brown | F23L 17/04 126/307 A |
| 2011/0114034 | A1* | 5/2011 | Aycock | F23L 11/005 122/14.2 |
| 2011/0174890 | A1* | 7/2011 | Kumar | F23D 14/58 237/48 |
| 2013/0231042 | A1* | 9/2013 | Coscarella | F24F 7/00 454/339 |
| 2014/0034046 | A1* | 2/2014 | Warmuth | B23P 19/00 454/243 |
| 2014/0061395 | A1* | 3/2014 | Allivato, Sr. | F16L 3/1207 248/74.1 |
| 2015/0276248 | A1* | 10/2015 | Bailey | F24F 3/16 454/356 |
| 2015/0354127 | A1* | 12/2015 | Ott | D06F 58/20 34/235 |
| 2015/0362209 | A1* | 12/2015 | Dolan | F24F 13/082 454/276 |
| 2016/0033160 | A1* | 2/2016 | Gaudet, Jr. | F24F 13/084 29/428 |
| 2016/0060873 | A1* | 3/2016 | Sugatani | F16L 11/15 29/401.1 |
| 2017/0089594 | A1* | 3/2017 | Small, III | E04H 4/0025 |
| 2017/0276400 | A1* | 9/2017 | Hugues | B01D 46/001 |
| 2018/0023808 | A1* | 1/2018 | Reiff | H02K 7/1815 126/312 |
| 2018/0066858 | A1* | 3/2018 | Fiser | B01D 46/00 |
| 2018/0080668 | A1* | 3/2018 | Booten | F24F 1/32 |
| 2018/0209645 | A1* | 7/2018 | Sugatani | F16L 11/11 |
| 2018/0306460 | A1* | 10/2018 | Weir | F24F 12/002 |
| 2018/0320924 | A1* | 11/2018 | Bryant | F24F 13/082 |
| 2019/0345756 | A1* | 11/2019 | Pemberton | E06B 7/02 |
| 2020/0011555 | A1* | 1/2020 | Mills | F24F 7/065 |
| 2021/0054685 | A1* | 2/2021 | Van Santen | F24F 13/18 |
| 2021/0302061 | A1* | 9/2021 | Parsons | F24F 13/084 |

OTHER PUBLICATIONS https://diy.stackexchange.com/questions/36975/can-i-modify-the-vent-from-my-high-efficiency-furnace-to-prevent-possible-damage (Year: 2013).* https://www.justanswer.com/hvac/8y95b-pipe-left.html (Year: 2015).*

Goodman_GMS9_GCS9 (Year: 2006).*

* cited by examiner

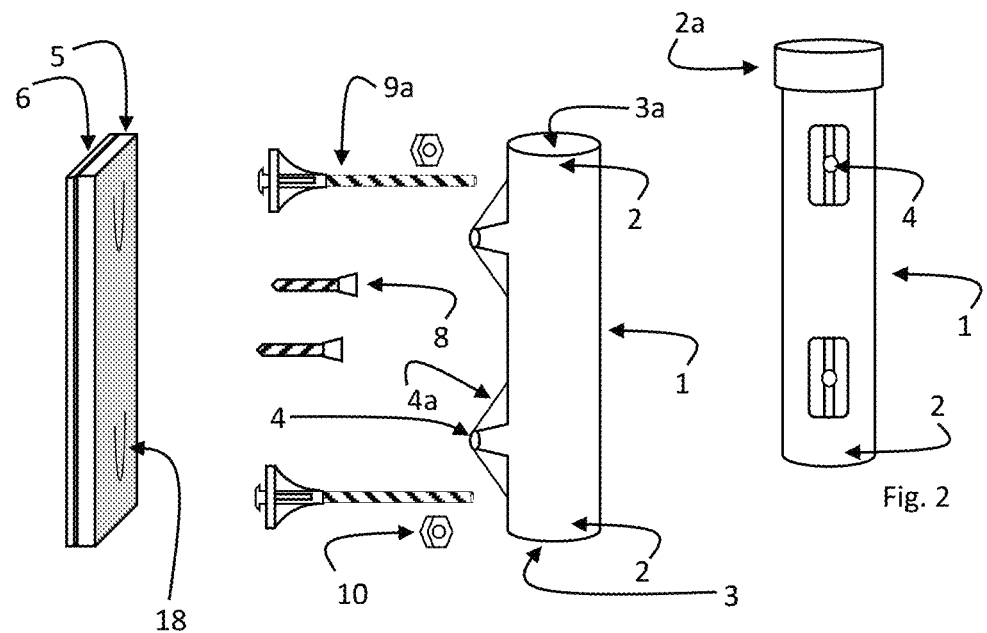
Fig. 1
Fig. 2
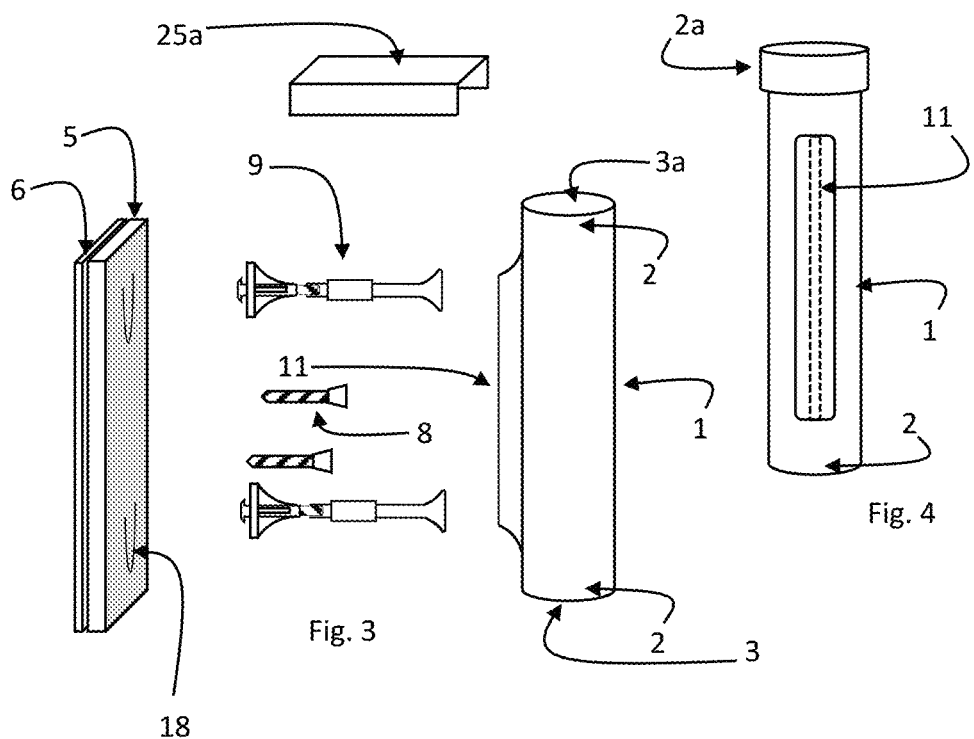
Fig. 3
Fig. 4

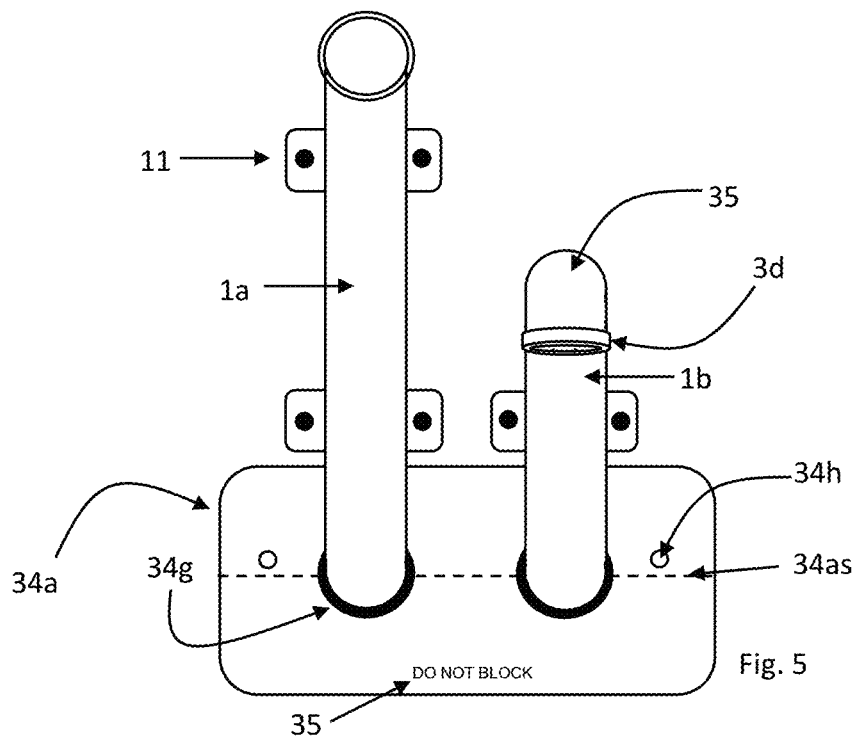
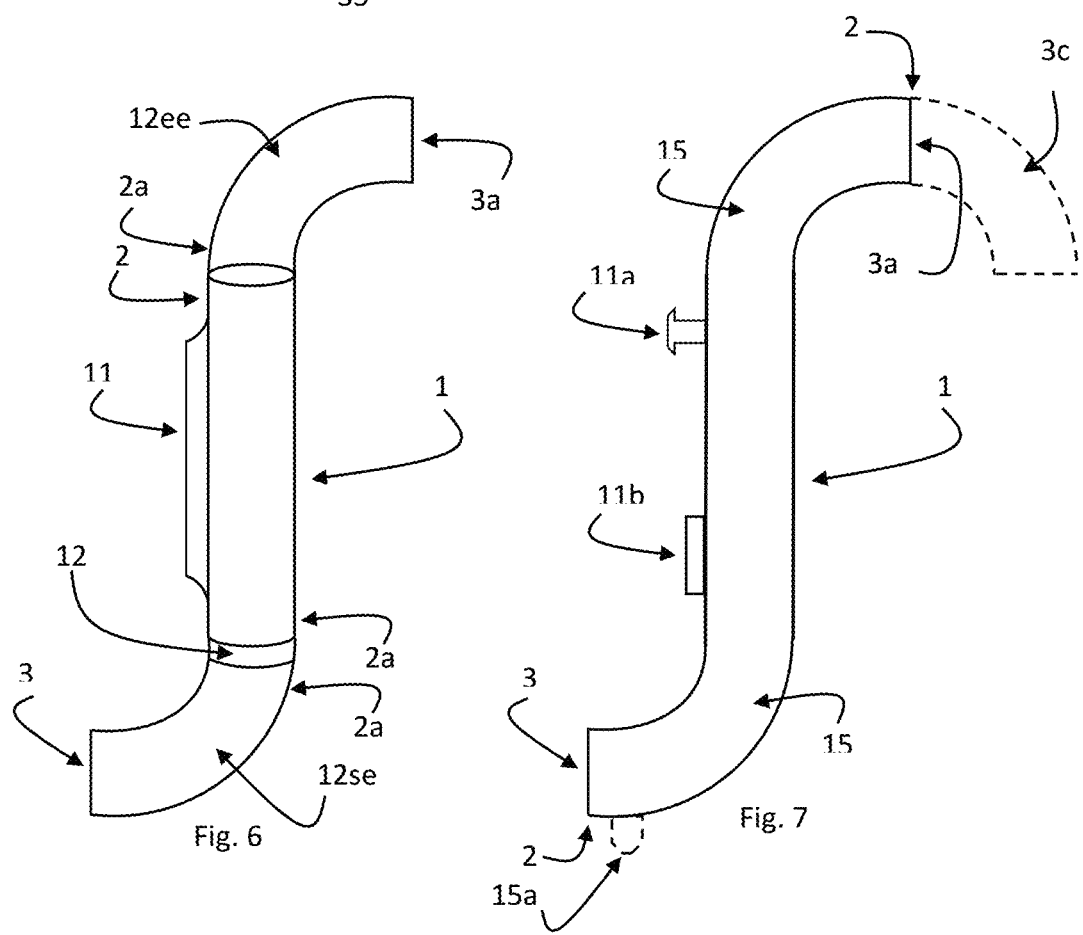

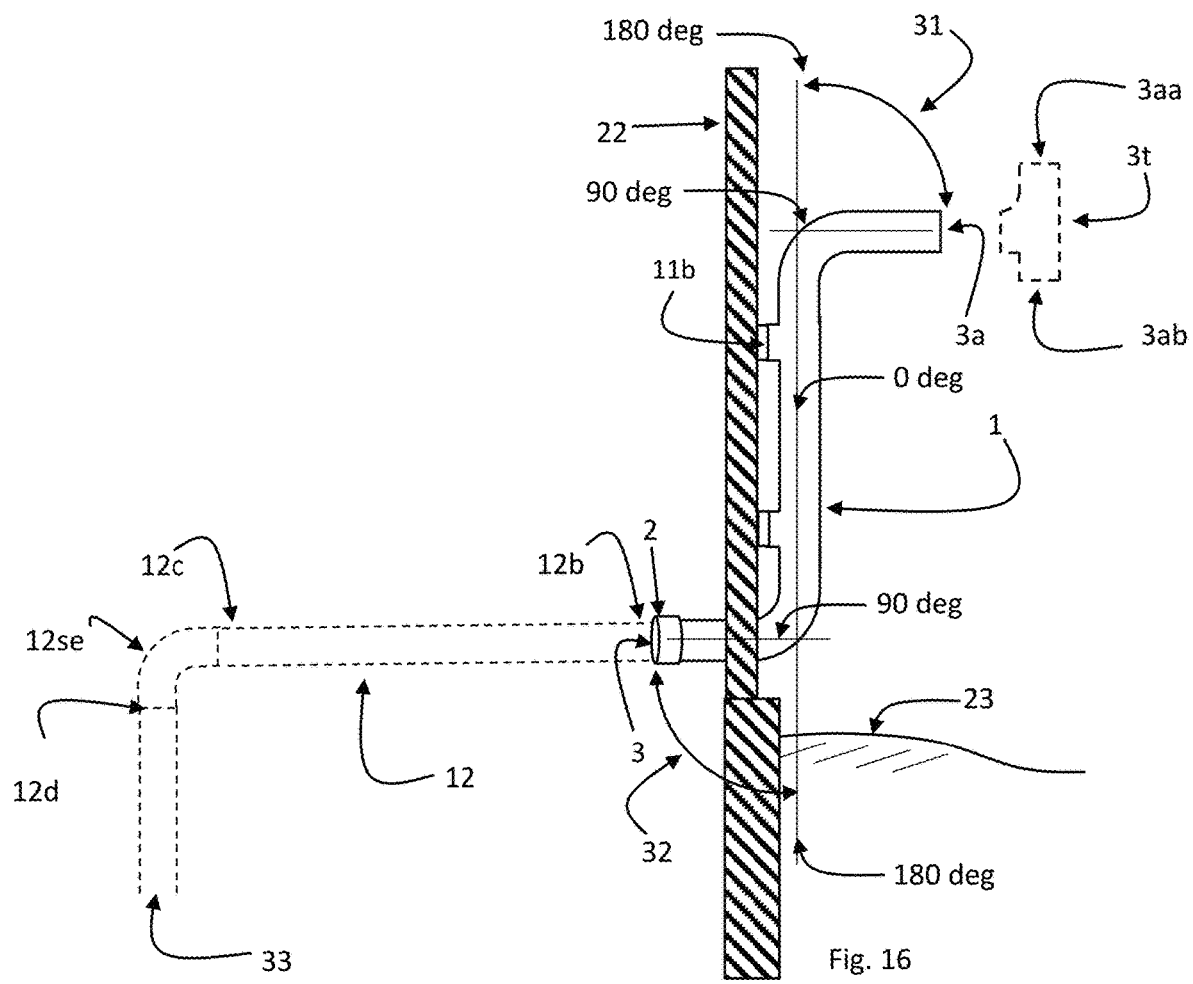
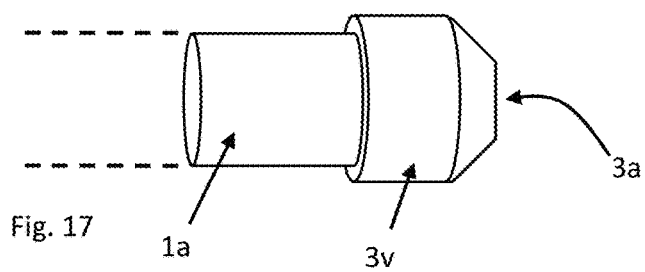
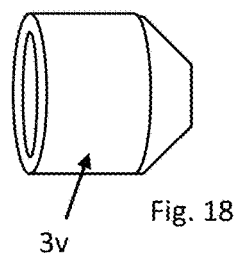

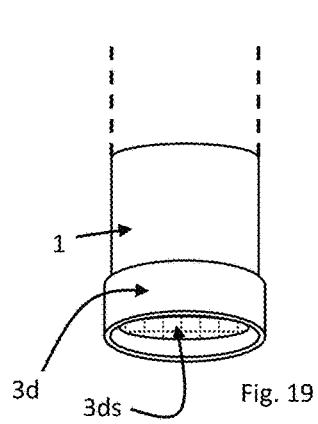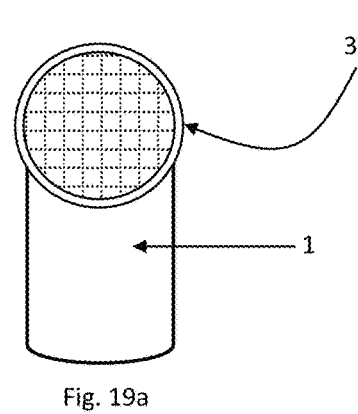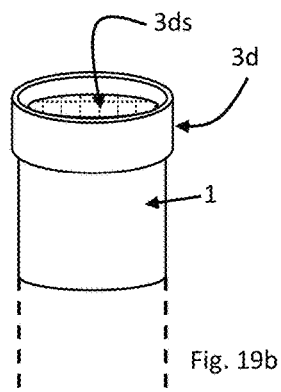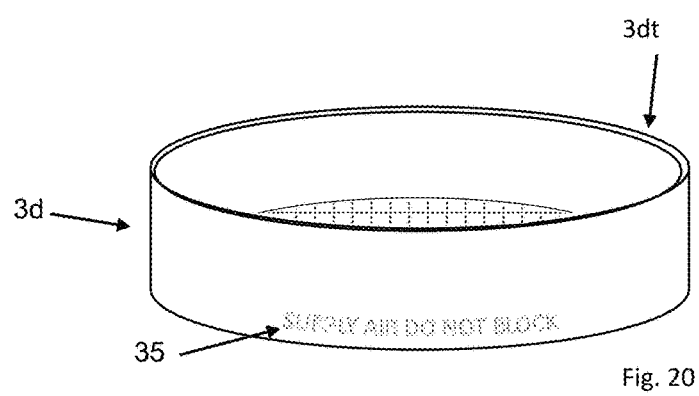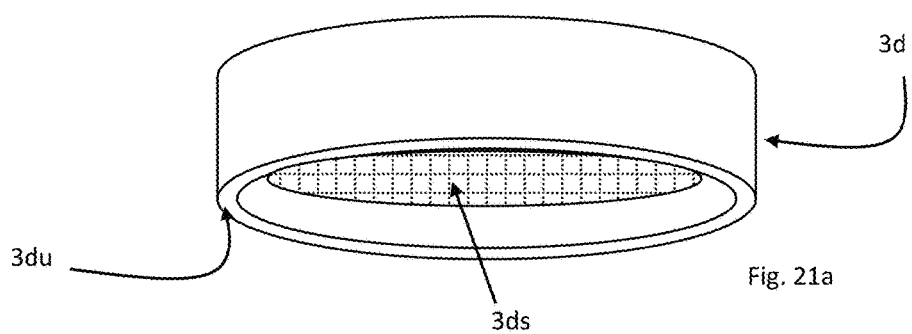

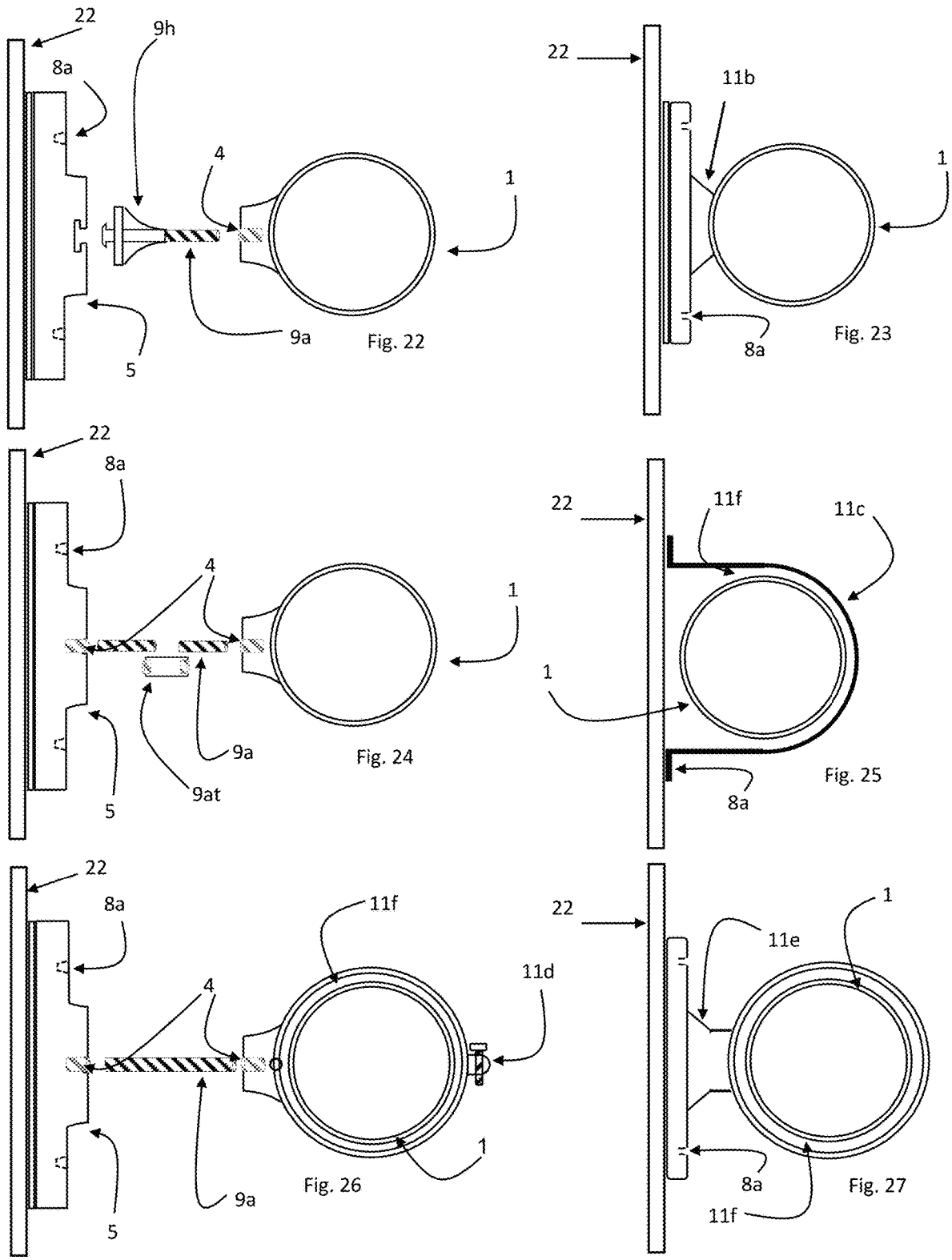

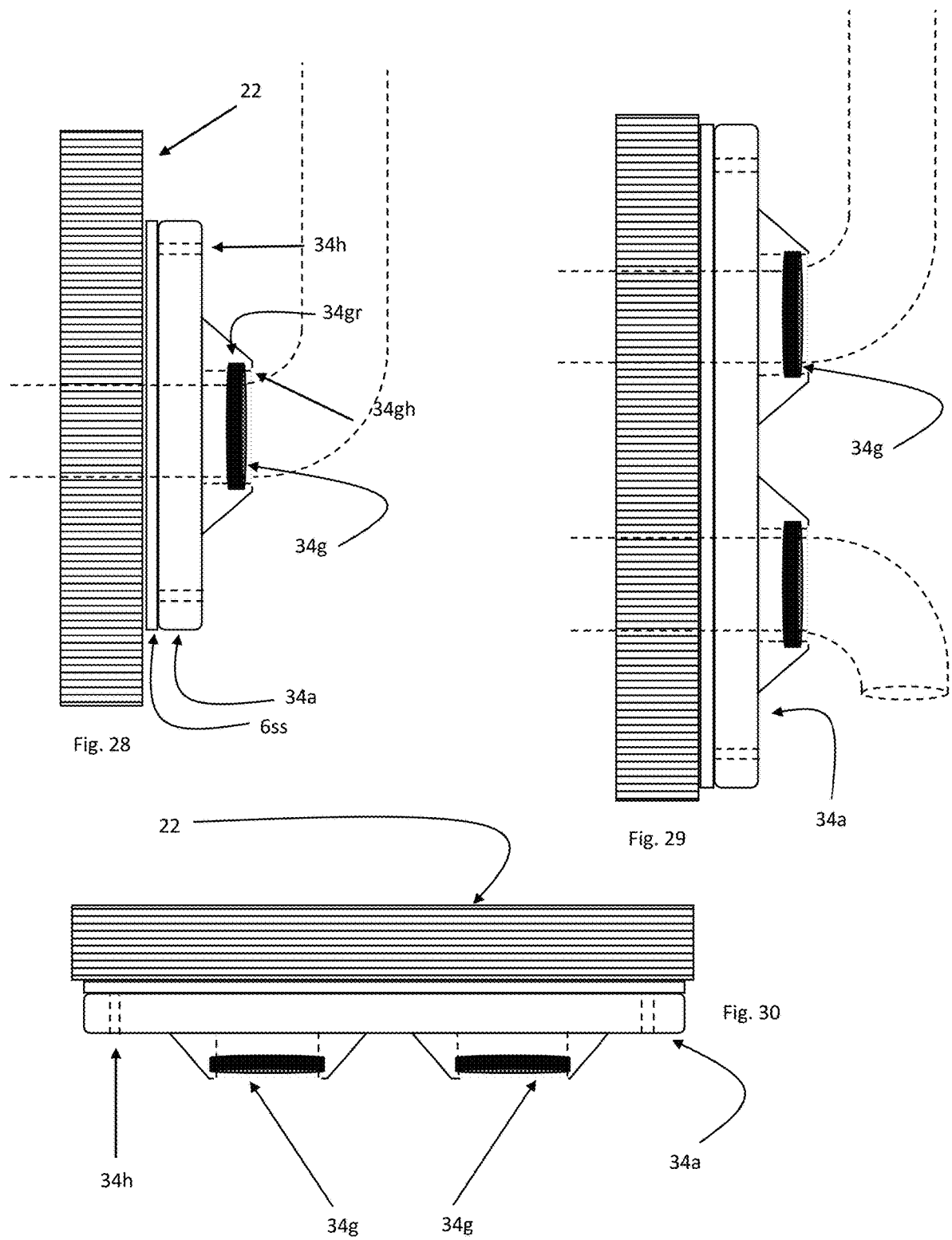

ONE PIPE OR TWO PIPE FLUE GAS AND COMBUSTION AIR SYSTEM

CROSS-REFERENCE TO RELATED APPLICATIONS

This application claims priority to provisional U.S. application Ser. No. 62/846,654 filed May 11, 2019.

FIELD OF INVENTION

This invention relates to the flue gas venting systems of fuel fired gas appliances, more particularly to the vent termination assemblies which include combustion air intake conduits used to convey combustion air from outdoors for a fuel fired appliance and/or the flue gas vent conduits used for the removal of the products of combustion from a fuel fired gas appliance to a safe location outdoors.

BACKGROUND

It is well known that indoor fuel fired appliances require the flue gases to be vented outdoors or outside a building envelope to a safe location. This in part is due to the products of combustion which can include harmful by-products such as carbon monoxide. If not vented correctly the products of combustion can pose serious health and safety concerns. Piping or conduits such as but not limited to PVC (polyvinyl chloride) or CPVC (chlorinated polyvinyl chloride) or PP (polypropylene) plastic conduits and fittings are commonly used to convey the products of combustion from a gas appliance flue collar to a safe location outdoors, which in some aspects includes a vent termination kit. These vent termination kits provide a method of bringing a combustion air intake conduit and a flue gas vent conduit together at a safe location outdoors and in some aspects provide methods to prevent flu products from being recirculated back indoors. Numerous prior art such as, but not limited to U.S. Pat. Nos. 9,731,387, 6,647,977, 6,102,030, 6,053,162, 5,282,456, 5,062,354, 4,690,129, 274,567 teach how to combine a combustion air intake conduit and flue gas vent discharge conduit or how to avoid recirculation of flue products or inhibit undesirable short circuiting of the closely adjacent combustion air intake conduits and flue gas vent conduits at the outer ends.

While previous prior art teaches and provides some solutions for the above and is of value, these taught or disclosed do not provide or teach of non-direct vent (one pipe systems) or direct vent (two pipe systems) where the combustion air intake conduits and flue gas vent conduits do not come together. It is well known to those skilled in the art that fuel fired appliance manufacturers allow for both one pipe and two pipe venting systems. The one pipe system has a flue gas vent conduit for the appliance flue gas discharge where the combustion air for the appliance is taken from the indoor location the appliance is installed and the two pipe system is where the gas appliance has two pipes or conduits to the outdoors wherein one is the combustion air intake conduit and the other is the flue gas vent conduit. Regardless of the system, one pipe or two pipe, both systems could be installed where the flue gas vent conduit or the combustion air intake conduit is only a singular pipe or conduit extending to or from the outdoors where the flue gas vent conduit and the combustion air intake conduit do not come together.

Such examples of this could be where the fuel fired appliance flue gas vent conduit and combustion air intake conduit would exit a building envelope too close to grade level where it is impractical or not possible to use large single pipe in pipe combination termination kits and the combustion air intake conduit and the flue gas vent conduit are routed from the exit points of the building envelope to a higher elevation above grade to a more preferred area. A further example could be where the installer is not permitted to cut large single pipe in pipe termination holes in the building envelope and is required to exit the building envelope with smaller holes choosing to use a one pipe system with only the flue gas vent conduit or two pipe system with smaller diameter piping for the flue gas vent conduit and the combustion air intake conduit. Yet another circumstance in which the combustion air intake conduit and or the flue gas vent conduit may have to be extended or be rerouted on the exterior of a building envelope might be where the exit location is too close to a building opening such as an openable window or door or a mechanical air intake, fresh air opening, or a moisture exhaust duct.

Currently single pipe termination systems are completed by the installer fitting pipe and pipe fittings together. The installer must measure pipe and distances, figure out angles, cut the pipe to desired lengths ensuring all piping is reamed and then the installer must prime and clean the pipe and the fittings prior to gluing. After applying the glue, the installer must level and position the pipe and fittings into their desired position before the glue cures. These site fabricated installations and methods are time consuming and challenging and, in some aspects, leaves the installer to his own interpretation of where the combustion air intake conduit and the flue gas vent conduit should be located from each other to prevent recirculation of the flue gas into the fresh air supply of the combustion air intake conduit or other building openings. Furthermore, when the installations are to be completed outside in all weather conditions the installer is faced with new challenges which can include cold weather where if steps are missed during the assembly catastrophic failures may occur if the fusion between the conduit and fittings did not adhere. Many of these outdoor fabricated on-site systems could be incorrectly installed or rushed and deemed deficient or substandard and do not pass inspections and must be cut out and done over. In aspects of the present invention no cutting of conduits, gluing, priming or fitting attachment is required outdoors providing a code compliant aesthetically pleasing risk managed installation.

Another problem installers are challenged with when using standard conduit and fittings is how to level vertical conduits outside the building envelope where attachment of a vertical conduit is fitted into a 90 degree elbow where the indoor conduit is graded or sloped downwards toward the fuel fired appliance for the purpose of condensate removal. This pipefitting condition is well known to those skilled in the art which causes the 90 degree elbow fitting to become unlevel when fused with graded or sloped piping or conduits which in turn causes the vertical conduits attached or fused to the 90 degree elbow fitting to become unlevel. While this condition is mathematically solved with the use of additional fittings it is not practical in most venting systems as the longest run (total vent length) corresponds with the number of fittings used and, in most cases, could lead to calculations which increase the vent conduit size.

Yet another burden installers are faced with is pipe attachment methods to a building structure and in many cases the installers are not given specifics on how to complete pipe attachments to a building structure. Where instruction is given this instruction may only refer to attaching the pipe or conduit with hangers or strapping that will not harm the piping or conduits and allows for expansion and contraction of the piping or conduit system. Such instructions leave many installers sourcing attachment methods to where no solution is provided and the installers are forced to affix wooden blocks or similar to a building structure between the vent conduit and building structure where the installer could then affix metal strapping around the piping or conduit and then affix the loose ends of the metal strapping back to the wooden blocks. This metal strapping when cut leaves sharp edges which can cause damages not only to the venting system but also to any person that comes into contact with such strapping including children. Methods of attachment in this manner are all too common and many owners and installers would prefer that unsafe and aesthetically unpleasing attachment methods not be used leaving the piping unsecure. This unsecure piping is vulnerable to stress and physical impacts such as forces caused by moving snow loads or forces that could occur from children playing or climbing or pulling on the piping or conduits.

Another concern with vent intake conduits or flue gas vent conduits when installed as singular piping which extends some distance on the exterior of the building or building envelope is identification for the conduits purpose. Vent conduit manufacturers provide conduit identification markings which could include the type of conduit material, the size and schedule of the conduit, the standard the conduit is approved or certified to, the manufacturers name and maximum temperatures the conduit may be exposed to. However, markings or warning labels may not include markings or warnings such as "FLUE GAS EXHAUST", "DO NOT BLOCK", "KEEP CLEAR OF SNOW OR VEGETATION" or similar. Many hazards are unknown to those not skilled in the art or in the functions these vent system conduits perform and may appear aesthetically unpleasing and individuals may want to plant vegetation or build architectural structures in close proximity to the fuel fired vent intakes or flue gas vent conduit outlets causing blocked vents or causing the recirculation of the products of combustion or other hazards. Accordingly, many of these conduits are located in areas of snowfall and must be clear of snow at all times for safe and correct operation of the fuel fired appliance. Typically, warnings such as those described previously appear in the manufacturer's installation and operating instruction manuals, however, many of these manuals are not left by the installer with the owner, or are lost over time or are simply not read by the owner. Regardless of why warnings are not read or understood in installation or operating instructions providing warnings directly on or in close proximity to the combustion air intake conduit or flue gas vent conduit removes any doubt the warning or meaning thus reducing hazards.

As provided within this writing and disclosure it can been seen that the combustion air intake conduit and flue gas vent conduit when installed as singular piping extending some distance on the exterior of the building or building envelope requires art for the above regardless of the system non-direct vent (one pipe) or direct vent (two pipe). As such, is provided by this now disclosed invention.

BRIEF SUMMARY OF THE INVENTION

Preferred embodiments may include in some aspects of the assembly a flue gas vent termination conduit and or a combustion air conduit used for venting systems of fuel fired gas appliances. One aspect of the termination assembly is a main embodiment or the Flue Gas Vent Conduit which may be used interchangeably as a Combustion Air Intake Conduit made of PVC (polyvinyl chloride) plastic or CPVC (chlorinated polyvinyl chloride) plastic or ABS (Acrylonitrile-Butadiene-Styrene) plastic or PP (polypropylene) plastic or similar. The formation of the main embodiment may be the shape and size of PVC (polyvinyl chloride) plastic pipe or CPVC (chlorinated polyvinyl chloride) plastic pipe or ABS (Acrylonitrile-Butadiene-Styrene) plastic pipe or PP (polypropylene) plastic pipe or similar wherein some aspects the ends of the main embodiment are formed and sized to accept the insertion of PVC or CPVC or ABS or PP pipe or the ends are formed to fit into the fittings of such pipe. The materials and methods and testing of the main embodiment could be approved or certified when desired to ASTM D1785, ULC S636, ANSI/UL 1738 and CAN/ULC S110 or similar standards including referenced standards within these standards. It is understood that these standards are amended from time to time and these amendments are to be within the scope of this invention. The main embodiment could have mounting features formed in whole or in part of the main embodiment which could accept connector elements such as bolts or threaded rod or be shaped to accept other connector elements as disclosed in the detailed description. Other parts of the main embodiment assembly could include a mounting bracket for mounting on the exterior of a building surface to accept a connector element which could connect the main embodiment to an exterior of a building surface.

According to one aspect of the invention there is provided a kit for forming an exterior fluidic duct to be fluidically communicated with an appliance located inside a structure through an opening formed in an exterior upright wall of the structure, the kit comprising:

a mounting bracket arranged for attaching on an exterior of said wall of the structure at a location above said opening formed therein to define a fixed mounting location of the kit;

a tubular conduit configured to convey gases to or from the appliance between opposite open ends of the conduit, wherein the conduit is configured to be supported by the mounting bracket in a generally vertical orientation in which one of the ends is disposed above the other end so as to define an upper end of the conduit which is in fluidic communication with an external environment of the structure and a lower end of the conduit to be arranged in fluidic communication with the appliance.

According to another aspect of the invention there is provided a kit for forming an exterior fluidic duct to be fluidically communicated with an appliance located inside a structure through an opening formed in an exterior upright wall of the structure, the kit comprising:

a tubular conduit configured to convey gases to or from the appliance between opposite open ends of the conduit, wherein the conduit is configured to be supported externally of the structure in a generally vertical orientation in which one of the ends is disposed above the other end so as to define an upper end of the conduit which is in fluidic communication with an external environment of the structure and a lower end of the conduit to be arranged in fluidic communication with the appliance;

and a cover assembly for forming a seal between the opening in the structure and the conduit arranged to pass therethrough;

wherein the cover assembly includes a cover panel arranged for attaching on the exterior of the wall of the structure at a location coincident with the opening therein;

wherein the cover panel defines an opening to be communicated with the opening in the structure, said opening of the cover panel being sized larger than an outer diameter of the conduit to enable passage of the conduit therethrough;

and wherein the cover assembly includes an annular gasket supported by the cover panel within the opening thereof and configured to sealingly receive the conduit therethrough.

According to yet another aspect of the invention there is provided a kit for forming an exterior fluidic duct to be fluidically communicated with an appliance located inside a structure through an opening formed in an exterior upright wall of the structure, the kit comprising:

a tubular conduit configured to convey gases to or from the appliance between opposite open ends of the conduit, wherein the conduit is configured to be supported externally of the structure in a generally vertical orientation in which one of the ends is disposed above the other end so as to define an upper end of the conduit which is in fluidic communication with an external environment of the structure and a lower end of the conduit to be arranged in fluidic communication with the appliance;

and a screen assembly for substantially obstructing passage of solid matter or animals from the external environment and into the conduit through the upper end thereof;

wherein the screen assembly comprises an annular resilient carrier body configured to be received in intimate relation over the upper end of the conduit and defining an opening, and a screen member defining a plurality of openings arranged to obstruct passage of the solid matter or animals therethrough, wherein the screen member spans across said opening of the carrier body.

According to a further aspect of the invention there is provided a method of forming a fluidic duct for fluidically communicating an appliance locating inside a structure through an opening formed in an exterior upright wall of the structure, the method comprising:

mounting a conduit, which extends from a first open end to a second open end, in fixed relation to an exterior of the structure, wherein mounting the conduit comprises passing one of the ends thereof through the opening in the structure to locate said end inside the structure;

and fluidically connecting the end of the conduit located inside the structure to the appliance.

BRIEF DESCRIPTION OF THE DRAWINGS

FIG. 1 is an exploded view of a style of a threaded attachment and vent termination.

FIG. 2 is a front view of a threaded attachment and vent termination.

FIG. 3 is an exploded view of a style of the click lock and vent termination.

FIG. 4 is a front view of a click lock and vent termination.

FIG. 5 is a front view of a two pipe venting system.

FIG. 6 is a side view of a click lock vent termination with attached 90 degree elbows.

FIG. 7 is a side view of other attachment means and vent termination where 90 degree or similar elbows are formed as part of the main embodiment.

FIG. 16 is a side view of a main embodiment of the present invention attached to a building wall where penetration is made through the building envelope to an indoor location.

FIG. 17 is a perspective view of the outlet of the main embodiment when used as a flue gas vent conduit.

FIG. 18 is a perspective view of a velocity fitting.

FIG. 19 is a perspective view of a carrier body at the inlet of a main embodiment when used as a combustion air intake conduit.

FIG. 19a is a front facing view of the carrier body.

FIG. 19b is a perspective view of a carrier body.

FIG. 20 is a top perspective view of a carrier body.

FIG. 21 is a perspective view of the screen member within the carrier body.

FIG. 21a is a bottom perspective view of a carrier body.

FIG. 22 is a plan view of a vent terminal where part of the hanger element is formed as part of the main embodiment of the vent terminal.

FIG. 23 is a plan view of a vent terminal where the mounting bracket is formed as part of the vent terminal.

FIG. 24 is a plan view of a vent terminal where part of the hanger element is formed as part of the main embodiment of the vent terminal.

FIG. 25 is a plan view of a vent terminal and a clip which is used to secure the vent terminal to a building or structure.

FIG. 26 is a plan view of a vent terminal and a split ring type hanger which is used to secure the vent terminal to a building or structure.

FIG. 27 is a plan view of a vent terminal and a ring type hanger which is used to secure the vent terminal to a building or structure.

FIG. 28 is a side view of a single gasket escutcheon.

FIG. 29 is a side view of a vertical double gasket escutcheon.

FIG. 30 is a plan view of a double gasket horizontal escutcheon.

DETAILED DESCRIPTION

Figure 8:
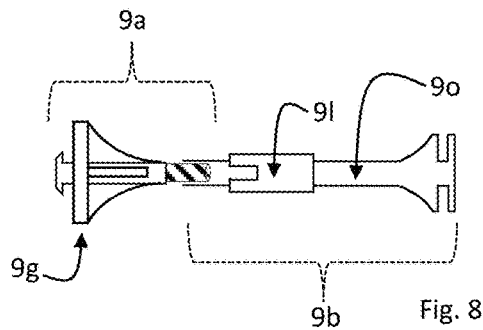
FIG. 8 is a top view of a click connector assembly

In the following descriptions with the use of the figures or illustrations, numerical and or alphabetical references may refer to similar components and elements. The components, elements and or embodiments may also be identified numerically, alphabetically, or a combination of both described or configured to point to one element, component or embodiment; where this appears, the meaning may be for all that appear as illustrated and described where sense can be made. The embodiments, components, configurations and materials illustrated in the figures or described within the descriptions are preferred embodiments only and are given for explanation purposes. Some embodiments of the disclosed invention and parts thereof can include other pipe or conduit attachment means or methods to attach piping or conduits which can include; socket ends where a pipe or conduit can be inserted into the socket, straight pipe ends for insertion into socket ends, flanged ends, threaded ends, other ends, or ends which are formed curved which may have socket ends or straight ends or any combination of ends. Materials discussed or described such PVC (polyvinyl chloride) plastic or CPVC (chlorinated polyvinyl chloride) plastic or ABS (Acrylonitrile-Butadiene-Styrene) or PP (polypropylene) plastic may include other plastics known or plastics which may not yet be developed or ferrous or non-ferrous metals. Additionally, it is assumed that approval or certification standards will be amended from time to time or replaced with other approval or certification standards and are to be included within the scope of the invention. Descriptions of well-known components may be omitted so as to not unnecessarily obscure the principle features of the invention. Terminology used herein, descriptions and figures are for the purpose of describing preferred embodiments and is not intended to be limiting of the invention. With respect to the descriptions; variations of size, assembly, materials and modifications that could be readily apparent and obvious to one skilled in the art should be understood to be within the scope of the invention. As such, all modifications or equivalents may fall within the scope of the invention.

As used herein, the use of singular terms may include plural or plural may be singular where sense can be made. The use of the wording "pipe" or "conduit" may be used interchangeably throughout this discloser and may have the same meaning. The vent termination 1 of this disclosure is not limited to any particular type of gas appliance or manufacturer, and as such, may be used where so desired for HVAC or similar equipment flue gas venting or combustion air intake systems which can include;

water heaters, furnaces, boilers or other such equipment known to those skilled in the art. The applications and use can include;

residential, commercial, or industrial which does not exclude other such terms where the meanings are understood by those skilled in the art.

The wording vent termination 1 or conduit 1 may be interchangeable which is to be understood for the purpose of description as either the flue gas vent conduit 1a for removing flue gases to an outdoor safe location or a combustion air intake conduit 1b which provides combustion, dilution, primary air, secondary air or other air into a building envelope for the purpose of combustion or similar. For the purpose of illustration and descriptive writings the flue gas vent conduit 1a and the combustion air intake conduit 1b may have the same meaning, this is not to be confused with site installation where the flue gas vent conduit 1a and the combustion air intake conduit 1b are separate and perform differently as illustrated in FIGS. 5, 14, 15, 32 through 40 and 41. The construction of the vent termination 1 whether a flue gas vent conduit 1a (removes flue gas) or combustion air intake conduit 1b (convey supply air into a building envelope) is likely to be similar regardless of the function with the exception that the vent termination 1 used as a combustion air intake conduit 1b might in some aspects have a material that need not be constructed to withstand the temperatures of the flue gas vent conduit 1a. This material may be, but not limited to, PVC plastic used in construction of the combustion air intake conduit 1b and CPVC used in the construction of the flue gas vent conduit 1a. Where materials and functions change, it is to be understood by the installer with the use of specific marks which might appear on the main embodiment such as but not limited to "Supply Air", "Combustion Air" or "Flue Vent" or similar wording which in some aspects could be a color change of the plastics which are known by those skilled in the art. The main embodiment of the vent termination 1 in some aspects may be insulated or provided with insulating materials.

The vent termination 1 as illustrated may have other parts or components which could be supplied as a package or "vent pipe termination kit". This "vent pipe termination kit" may have such parts as;

a vent termination(s) 1, mounting bracket 5, screws 8, wall anchors, click connector 9, threaded nuts 10, click connector cover 25a, velocity fitting 3v, protection shield 25, carrier body 3d, 90 degree fitting elbows, sloped vent fitting 12se, outlet T 3t, decals or labels (not shown), escutcheon covers 34a, insulating materials (not shown), caulking or other similar components required or needed (not shown).

The vent termination 1 which is a cylindrical conduit in which the flue gases or combustion air pass through where connector elements attach the vent termination 1 to a building or similar structure or to a mounting bracket 5 which is affixed to building or similar structure. In some aspects the connector elements may be formed in part or in whole (FIG. 23) of the main embodiment of the vent termination 1 when installed at a building exterior wall or in places where the connector elements could be required, however, if installed through a roof the connector elements may not be required and would not appear. The cylindrical shape of the vent termination 1 may in some aspects be square or a rectangular 1s (FIG. 12) in outward appearances having a cylindrical or round interior with the outer ends 2 round or formed cylindrical capable of engaging the terminal ends of a conduit by others 12 or conduit fitting. The vent termination 1 may have an inlet 3 and outlet 3a or outlet T 3t which are understood to be for a flue gas vent conduit 1a where the products of combustion are vented to the outdoors where the flue products enter at the inlet 3 and exit at the outlet 3a or outlet T 3t. Accordingly, the inlet 3 and outlet 3a would be reversed when the main embodiment vent termination 1 serves the purpose of combustion air intake conduit 1b as instructed within these writings. The main embodiment ends 2 of the vent termination 1 regardless of "flue gas vent conduit" or "combustion air intake" may be formed exactly as conventional piping. The ends 2 of a vent termination 1 are capable of engaging the terminal ends of an exhaust conduit by others 12 where the ends 2 of a vent termination 1 may fit into fittings of a conduit by others 12 system or be formed as fitting ends or sockets in which case the ends 2 are made to accept conduit by others 12 ends. The vent terminations 1 main embodiment may be curved 15 where the ends 2 can be formed as pipe fittings having ends 2 as described above. The ends 2 and vent termination 1 are sized with a variety of sizes which can include, but are not limited to 1½ inch, 2 inch, 2½ inch, 3 inch, 4 inch, 6 inch, 8 inch. Sizes factor relationships might be those which are determined by such factors as the venting systems longest run, type of fittings and numbers of fittings used within the venting system which could be measured from the flue collar of the appliance to the end of the vent termination 1. While these may not be the only determining factors in the size, other factors are not omitted which are understood to those skilled in the art. The understanding of normal vent pipe size is considered normal to the size of the vent termination 1 ends 2 as disclosed. Conduits by others 12 and conduit fitting attachment methods to the main embodiment of this invention will be typical of the conduit by others 12, pipe, fittings or device manufacturer which includes the use of primers prior to gluing, bonding or fusing where they are respectively understood by those skilled in the art.

Referring now to FIGS. 1, and 22 a main embodiment of a vent termination 1 which is illustrated with a threaded rod connector inlet 4 moulded as part of or in whole of the main embodiment 1 for the purpose of attachment to a connector element wall lock 9a or any such threaded conventional connector element where the connector element is threaded into the rod connector inlet 4 where a threaded nut 10 could be used additional if so desired to retain the connector element from accidental movement after installation. The rod connector inlet 4 may be formed with stabilizers 4a or similar which may surround the threaded inlet of the rod connector inlet 4 for rigidity. Further illustrated a mounting bracket 5 with resilient contour pad 6 can be affixed to a structure with conventional screws 8. Attachment of connector elements including wall lock 9a is made at wall bracket slot 18 within the mounting bracket 5. However, it is possible to connect threaded rod 9a to other wall mounting brackets 5a illustrated in FIGS. 24 and 26.

FIG. 2 is an illustration of a main embodiment of a vent termination 1 providing a view of a vent termination 1 end 2 formed to be inserted into a fitting. Fitting end 2a (FIG. 4) is provided to give illustration of a socket type end formed to accept a vent conduit end being inserted into the fitting end 2a.

The main embodiment of a vent termination 1 as illustrated in FIG. 3 now has an insert slide 11 as an option to the rod connector inlet 4 of FIG. 1. This insert slide 11 when connector element click connector 9 is used provides a means for rigid attachment to the mounting bracket 5 while allowing expansion and contraction movement at the insert slide 11. While the expansion and contraction rate is not anticipated to be great, provision is accounted for in this design. A front facing illustration of the insert slide 11 is provided in FIG. 4.

FIG. 5 illustrates two separate vent terminations 1 installed outside a building envelope described as a flue gas vent conduit 1a and a combustion air intake conduit 1b that are separate from one another and extend upward from an escutcheon cover 34a which is marked with a warning 35 in a generally side by side arrangement. However, the terminations may be configured other than a generally side by side arrangement. The flue gas vent conduit 1a is used to convey the products of combustion from an appliance located within a building envelope to a safe location outdoors and the combustion air intake conduit 1b is used to convey combustion air from an outdoor location directly to an appliance located inside a building envelope or generally into a space within the building envelope. As each vent termination 1 is singular it is to be understood that either may appear without the other which can include one pipe systems, two pipe systems or for supplying combustion air for atmospheric vented appliances or where air is needed to replace building air that is exhausted. Both vent terminations 1 in this illustration are unitary in construction and formed with changes of direction 15 molded as part of the main embodiment of the vent terminations 1 which eliminates joining and fusing fittings 12se, 12ee and conduits by others 12. The combustion air intake conduit 1b additional has a downward turn 3c at the inlet which is fitted with a carrier body 3d. However, the downward turn 3c and/or carrier body 3d may not always appear.

FIG. 6 illustrates a vent termination 1 where attachment to sloped vent fitting 12se or standard 90 degree elbows conduit fittings 12ee are made where the flue gasses enter at inlet 3 then pass through the vent termination 1 and exit to a safe location outdoors at the outlet 3a. Fitting ends 2a provide a socket for a conduit 12 to be inserted where gluing or fusing or gasket seals or similar completes a gas tight joint at the inlet of the vent termination 1. This same attachment method is possible at the exit of the vent termination 1, however for illustration purposes the exit end 2 is formed to fit into the socket or fitting end 2a of a 90 degree elbow or similar conduit fitting 12ee.

FIG. 7 provides illustration of a vent termination 1 in which no gluing or fusing or inserting is required for changes of direction 15. The main embodiment of the vent termination 1 is formed without joints which in some aspects include an outlet T 3t illustrated in FIG. 16 where flue gasses exit the outlet T 3t at T top 3aa and the T bottom 3ab. The T bottom 3ab may also function as a condensate drop out location. Referring back to FIG. 7 and the end 2 at the inlet 3 which can be described as being elongated to extend some distance on the interior of a building envelope where no gluing fittings or pipe attachment is required outside the building envelope, furthermore this interior extension of the vent termination 1 can be formed at an angle that compensates for conduit by others 12 grade or slope (greater than 90 degrees) at the inlet 3 where illustration is provided in FIG. 16. The ends 2 have allowances for the attachment to a conduit by others 12 (FIG. 16) with glues or fusing means or similar including inserting into gasket sockets as normal to the conduit installer. In some aspects the end 2 at outlet 3a may require no further actions and be the terminal end of the flue gas vent conduit 1a where no extra piping is required. However, if used as the start of the inlet to a combustion air intake conduit 1b a downward turn 3c could be attached or moulded as part of the main embodiment of a vent termination 1 which could include a carrier body 3d (FIG. 5, 15, 19, 19a, 19b, 20, 21a). Connector elements circular tab 11a or hanger element 11b may be formed as part of the main embodiment of the vent termination 1. However, when not formed as part of a vent termination 1 other methods of structure attachment are possible with the use of conventional hangers that allow for expansion and contraction where a void 11f is between the main embodiment of a vent termination 1 and the conventional hanger, such as, but not limited to clip 11c FIG. 25, split ring 11d FIG. 26, or ring type 11e FIG. 27. Circular tab 11a can be attached to the mounting bracket 5 as illustrated throughout and hanger element 11b would require no connecting actions as the hanger element 11b functions as both the connector element and mounting bracket also illustrated in FIG. 23. The hanger element 11b could be placed directly on surfaces where conventional screws or similar could be used to secure the main embodiment of the vent termination 1 to a structure illustrated in FIGS. 16 and 23. A condensate drain 15a can be formed as part of the main embodiment at locations where condensate or moisture could collect either interior or exterior of a building envelope. The condensate drain 15a could be a socket end or barbed end or threaded end or similar to allow for additional piping to be affixed.

Figure 8A:
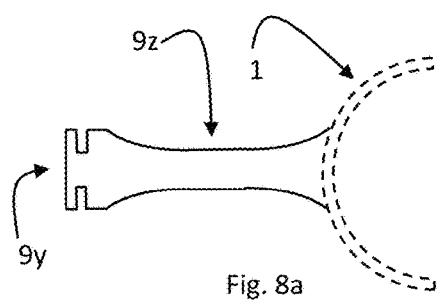
FIG. 8a is a top view of a solid connector.
Figure 9:
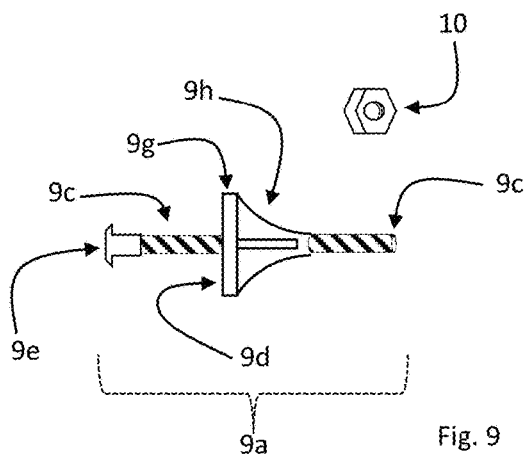
FIG. 9 is a top view of a wall lock of the click connector assembly.
Figure 10:
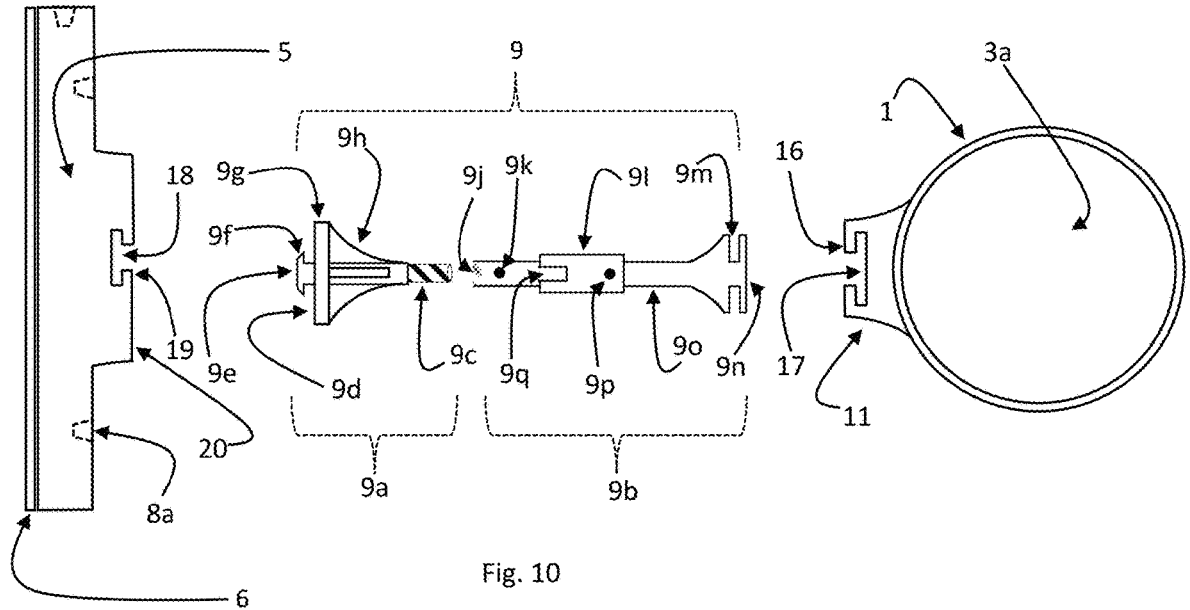
FIG. 10 is a top view of a wall bracket, click connector and vent body.

Referring now to FIG. 8, FIG. 9 and FIG. 10 where a click connector 9 could be described as having two parts of the main embodiment; these parts are, the wall lock 9a which is the connector end that attaches to the mounting bracket 5 and the vent slide 9b that attaches to the vent termination 1. These two components attach at the vent slide threaded opening 9j which is used not only for the purpose of attachment but also for lengthening or shortening the overall length of the click connector 9. This change in length is completed by tightening inward or loosening outward the rod thread 9c. Where the desired length has be achieved the click connector 9 may be slid into the wall bracket slot 18 and the vent termination 1 insert slide 11 simultaneously where the base 9n fits flush with the slide base 17 of the insert slide 11 which is held fast allowing for slight movement by the insert slide fingers 16 positioned between the front face 9m and base 9n of the click connector 9. The wall lock grip 9e positioned inside the wall bracket slot 18 is held fast by the wall lock grip rim 9f positioned behind the wall bracket lip 19. This now held fast position of the wall lock 9a is secured with the tightening nut 9g which can be threaded towards the wall bracket face 20 with the use of wings 9h of the tightening nut 9g. With the tightening nut face 9d flush with the wall bracket face 20 the click connector 9 is secure where the slide lock 9l can be positioned where the slide lock opening 9q is around a wing 9h of the tightening nut 9g. Outward divot 9k and inward divot 9p may be used to provide a securing means for the slide lock 9l by the fitting or mating of the outward divot 9k which is formed as part of shaft 90 into the inward divot 9p formed as part of the slide lock 9l. Referring now to FIG. 8a which is illustration of a solid connector 9z which can be formed in part or in whole of the vent termination 1 where the attachment end 9y could be slid into the wall bracket slot 18 of the mounting bracket 5 (FIG. 10).

Figure 11:
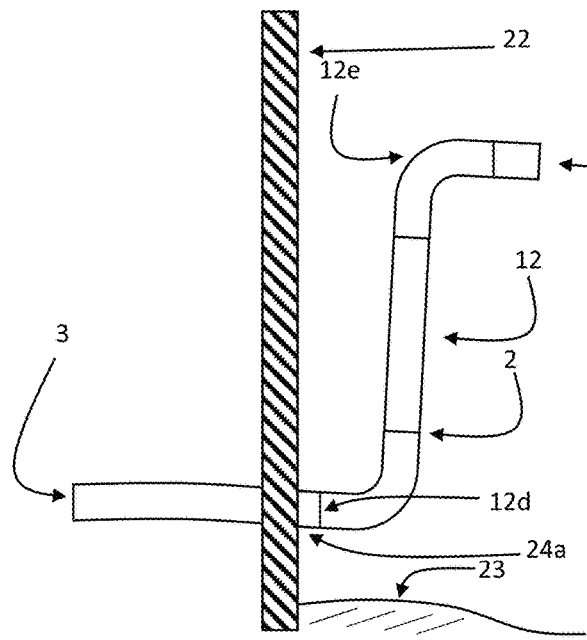
FIG. 11 is a side view of a one pipe vent termination without the use of the click lock vent termination.
Figure 12:
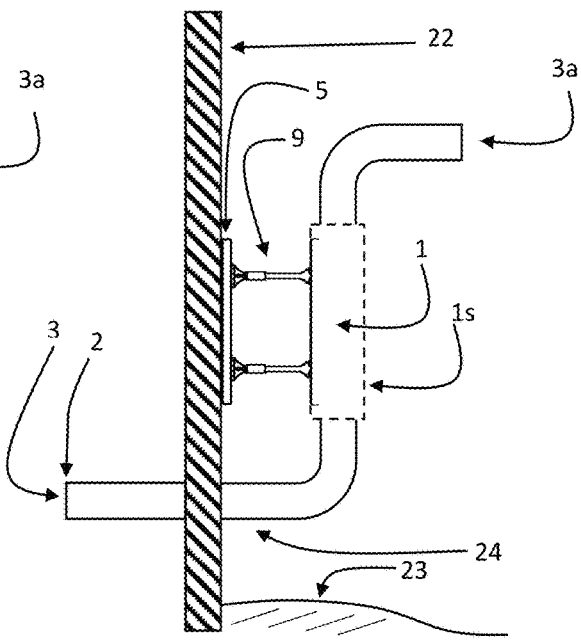
FIG. 12 is a side view of a one pipe vent termination with the use of the click lock vent termination.

FIG. 12 provides illustrations of a vent termination 1 which is leveled and secured where no fatigue 24 or stress is possible. This fatigue 24a (FIG. 11) at building wall 22 is probable where a vent termination 1 is not used but rather a conduit by others 12 (FIG. 11) was chosen for the installation. Grade 23 level is illustrated to show where a vent termination would be too close to grade 23 level and required to be located at a higher elevation which is accomplished by the use of vent termination 1 (FIG. 12) or conduit by others 12 and conduit fittings 12e of FIG. 11. The fatigue 24a illustrated in FIG. 11 can cause not only stresses which create catastrophic failure of the conduit by others 12 which in turn could cause recirculation of flue products into a combustion air intake but also cause condensation to accumulate. Referring again to FIG. 12 the use of vent termination 1, click connector 9 and mounting bracket 5 inhibit or prevents the sagging or broken conduit by others 12 or piping as illustrated in FIG. 11. This method of securing the vent termination 1 is possible with other descriptions as disclosed such as those of FIG. 7. The main embodiment of the vent termination 1 as illustrated may extend into the building envelope providing a seamless no exterior conduit fitting 12e (FIG. 11) or conduit joint 12d (FIG. 11) installation removing risk factors associated with such fittings 12e or conduit joints 12d.

Figure 13:
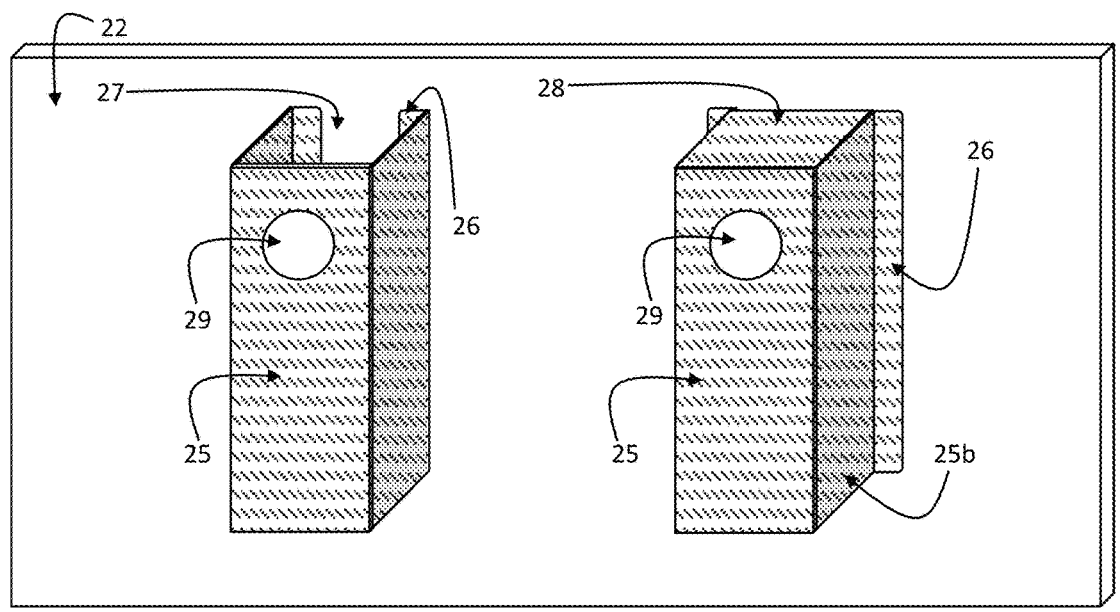
FIG. 13 is a perspective view of a vent termination cover.

Referring now to FIG. 13 which provides illustration of a protection shield which can be placed over the vent termination 1 where the outlet 3a can be positioned center of the opening 29. This protection shield may appear with a cover 28 or as an open top 27. Attachment plates 26 may be inside or outside the protection shield extending from the side walls 25b, however the attachment plates 26 are optional to where the protection shield is affixed to the mounting bracket 5 from the front or side where the mounting bracket 5 may have predetermined holes 8a for the purpose of attachment. The protection shield not only provides protection for the main embodiment of the vent termination 1 it may have guides clips located inside the protection shield behind the base wall 25 for use in supporting the main embodiment of a vent termination 1 where no attachment means are required for the main embodiment of the vent termination 1 to a building wall 22 when the protection shield is affixed to the building wall 22. In some aspects of a protection shield insulating materials could be incorporated inside the protection shield for the purpose of insulating the main embodiment of vent termination 1. Additionally, insulating materials could be provided on or within some aspects of the main embodiment of a vent termination 1.

Figure 14:
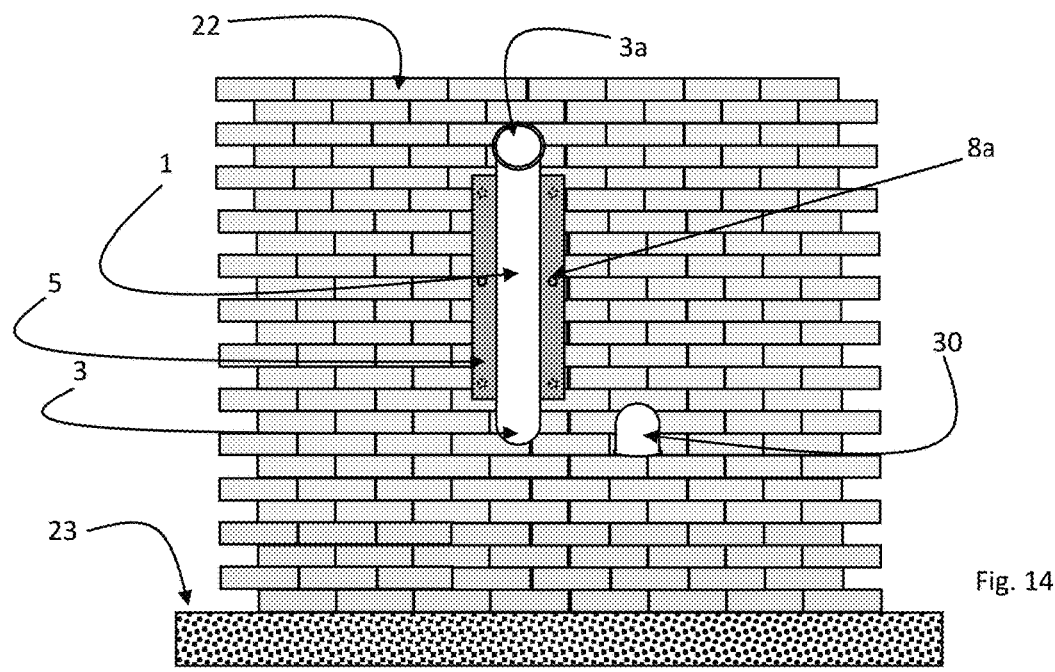
FIG. 14 is a front elevation view of a two pipe system with main embodiments of the present invention attached to a structure.
Figure 15:
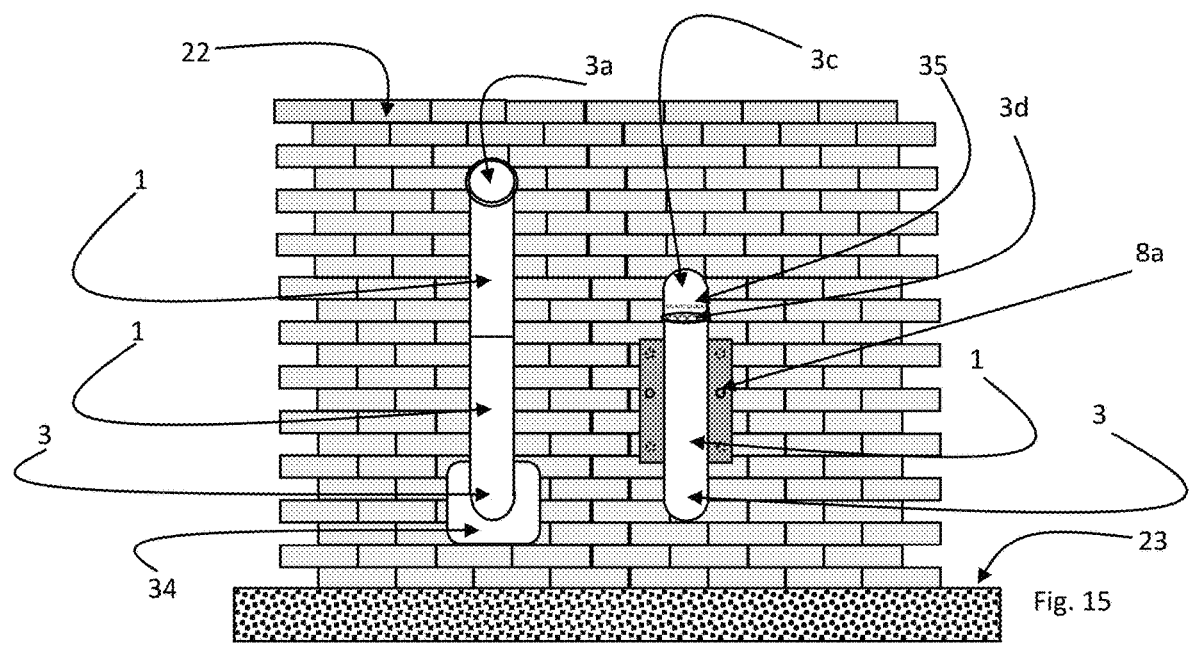
FIG. 15 is a front elevation view of a two pipe system with main embodiments of the present invention attached to a structure.

FIGS. 14 and 15 are front illustrations of a two pipe venting system where attachment of the mounting brackets 5 to a building wall 22 is completed with the use of conventional connector elements at holes 8a. FIG. 14 grade 23 elevation is lower in relation to the venting system outlet 3a and combustion air intake 30 which allows the combustion air intake 30 to simply be placed facing downward whereas the higher grade 23 elevation of FIG. 15 requires the combustion air intake 30 be elevated prior to facing downward which is accomplished with vent termination 1.

A carrier body 3d (FIG. 19, 19a, 19b, 20, 21a) used to prevent foreign debris, birds, rodents, animals or similar from entering the combustion air intake vent termination 1 may be formed with resilient plastic or metal which is placed over the intake end (FIG. 5, 19, 19a, 19b) allowing a tight fit regardless of expansion or contraction. The screen member 3ds openings are expected to be at least ¼ inch in size which may have a solid outer ring 3do. The screen member 3ds may be removable (FIG. 21) or formed as part of the carrier body 3d. The proximal side 3dt (FIG. 20) may be pliable with a thickness or schedule less than the schedule of the distal side 3du (FIG. 21a). Additionally, the distal side 3du thickness may be the same thickness or schedule as the vent termination 1 providing a seamless transition where moisture and ice cannot collect. It should be understood the carrier body 3d may be installed or fitted in any direction where the screen member 3ds can be positioned downward (FIG. 19), horizontal (FIG. 19a), upward (FIG. 19b) or any position between upward or downward. Warning 35 markings may also appear on the carrier body 3d for the purpose of instruction.

Referring back to FIG. 15 which further illustrates two vent terminations 1 coupled together used for exhausting the flue gases.

Referring now to FIG. 16 which is a main embodiment of a vent termination 1 in which the main embodiment is formed continuous which can include; directional changes, and the mounting bracket 5 formed as part of the main embodiment where no additional connector elements are needed to attach the mounting bracket 5 to the vent termination 1. Directional changes may be perpendicular to the middle of the main embodiment or sloped or angular as illustrated with the use of up radius segment 31 or down radius line segment 32. The outlet 3a portion of the main embodiment could be angled upwards at any angle illustrated as up radius line segment 31 starting at 90 degrees and ending at 180 degrees and the inlet 3 portion of the main embodiment could be angled downward at any angle illustrated as down radius line segment 32 starting at 90 degrees and ending at 180 degrees. The angles formed not perpendicular in some aspects illustrated at inlet 3 provide a fitting end 2 which is able to accept a sloped or graded conduit end 12b where the conduit by others 12 is sloped back towards conduit end 12c which allows any condensate to drain or flow back to the appliance flue collar 33. This allowance for sloped pipe attachment respectively allows attachment of the main embodiment of the vent termination 1 to the building wall 22 to be correspondingly level which in turn provides a level flush hanger element 11b describe in FIG. 7. If so desired this unique venting angle could be formed as a special single sloped vent fitting 12se where the angle might be slightly greater than 90 degrees to compensate for graded or sloped conduits which might be at any location in a venting system. With the use of illustration it is noticeable that the numbers of conduit joints 12d are dramatically reduced where none are located outside the building envelope with the use of a vent termination 1. This vent termination 1 may also reduce the distance from the building wall 22 to the end of the outlet 3a or the vertical centerline of the main embodiment of the vent termination 1.

The outlet 3a circumference of a main embodiment 1 (FIG. 17) when used as a flue gas vent conduit 1a may in some aspect be smaller for the purpose of accelerating the flue gases as they exit the main embodiment 1. This decreased circumference 3v at the outlet 3a may be provided optional as a velocity fitting (FIG. 18a) which could later be added by the installer.

Figure 31:
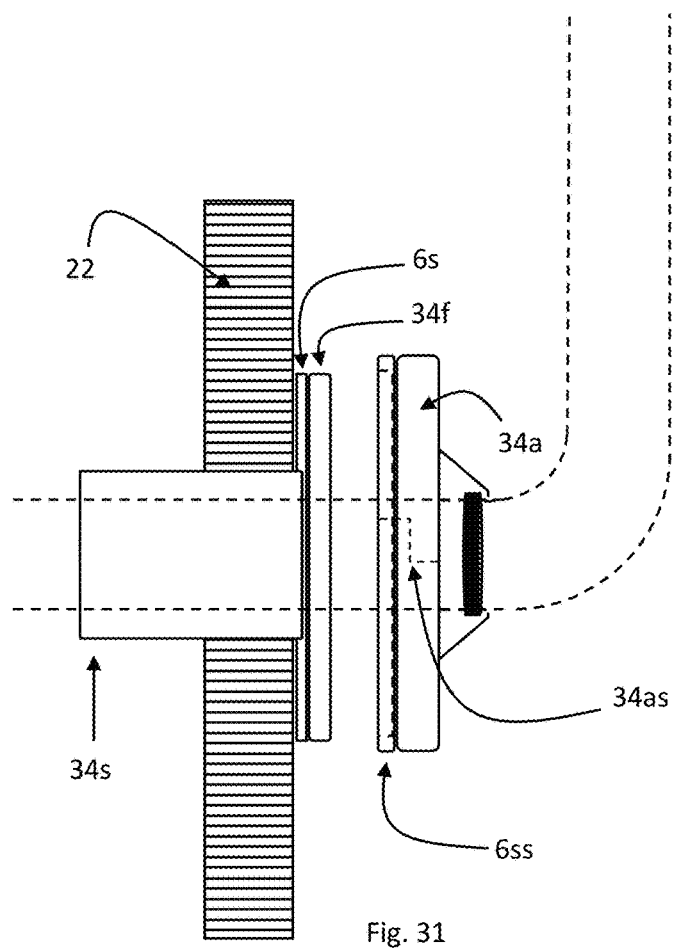
FIG. 31 is a side view of a two-piece escutcheon and a wall sleeve.
Figure 32:
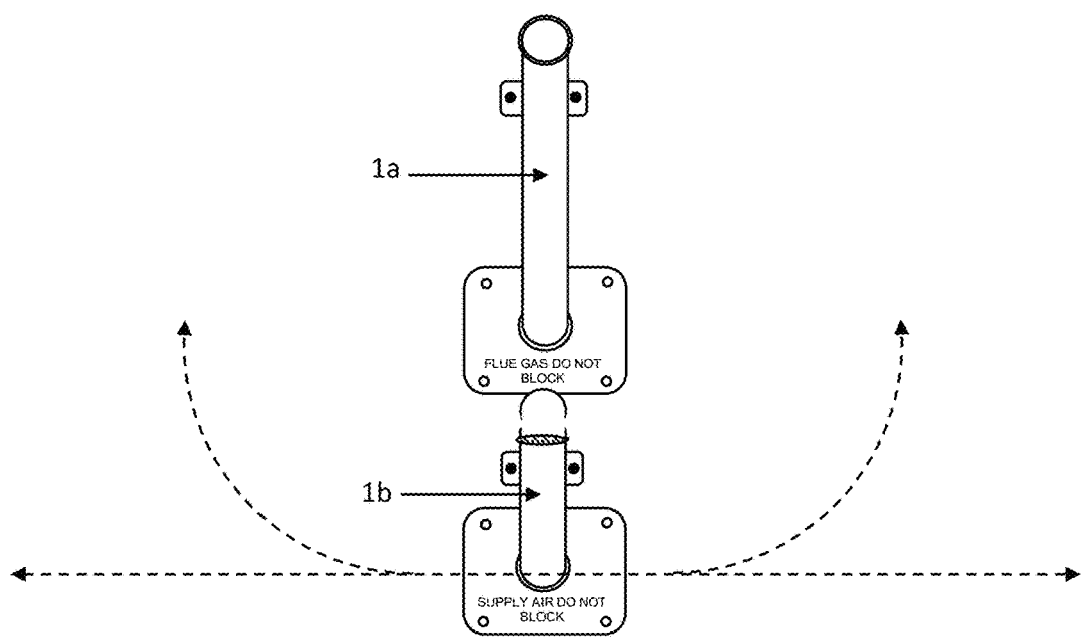
FIG. 32 is a front view of vent terminations.

An escutcheon cover 34a (FIG. 28) placed on a building wall 22 penetration secured with the use of conventional screws nails or similar through predetermined holes 34h in escutcheon cover 34a could be used to seal areas around a vent termination 1 building entry point from weather, rodents, insects or the like with a rubber or similar gasket 34g that completely surrounds the vent termination 1. This method of gasket 34g sealing allows the vent termination 1 to expand and contract providing an advantage over silicone type sealants which crack and move and require annual maintenance. The gasket 34g is positioned and affixed within a groove 34gr of the escutcheon cover 34a which is held in place by the front groove 34gh. The escutcheon cover 34a can be formed with singular gaskets 34g or with double gaskets 34g (FIG. 5, 29, 30) which can be positioned side by side (FIG. 30) or one on top of the other (FIG. 29). In some aspects the escutcheon cover 34a can be in two parts where an overlapping joint 34as would appear within the main embodiment. Where an overlapping joint 34as appears it would be anticipated that the predetermined holes 34h would be positioned to secure the overlapping joint 34as (FIG. 5). For liquid tight escutcheon cover 34as installations a resilient contour sealing pad 6ss could be added to the back of the escutcheon cover 34a sealing against a building wall 22 or sleeve 34s (FIG. 31). When a sleeve 34s is used in conjunction with an escutcheon cover 34a the sleeve 34s could also be fitted with a resilient contour sealing pad 6s positioned behind the flange 34f. Dotted extension lines extending outward from the combustion air intake conduit 1b in FIG. 32 are provided to illustrate that the installation location is not limited around a flue gas vent conduit 1a. Vent terminations 1 are site specific, as such, they can have virtually any configuration.

Figure 33:
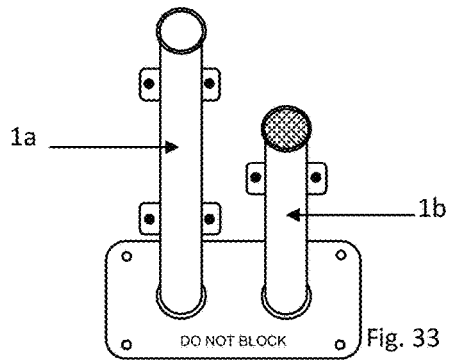
FIG. 33 is a front view of the vent termination used as a flue gas vent conduit and combustion air intake conduit where the combustion air intake conduit does not have downward turn.
Figure 34:
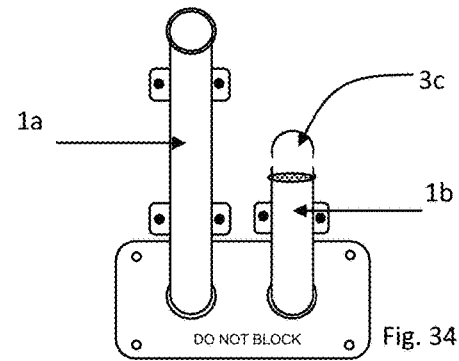
FIG. 34 is a front view of the vent termination used as a flue gas vent conduit and combustion air intake conduit where the combustion air intake conduit is formed with a downward turn.
Figure 35:
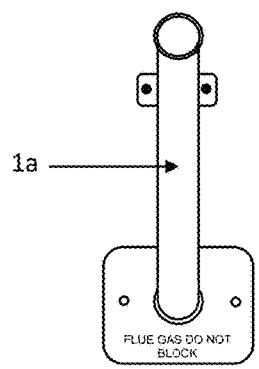
FIG. 35 is a front view of the vent termination used as a flue gas vent conduit.
Figure 36:
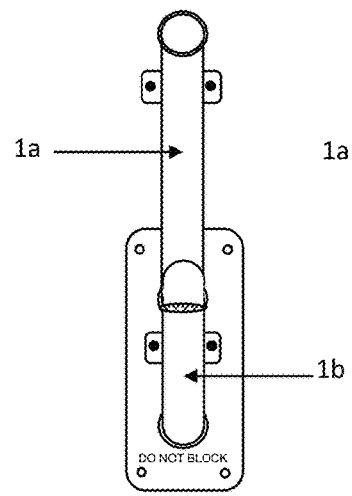
FIG. 36 is a front view of the vent terminations used as a flue gas vent conduit and combustion air intake conduit where the combustion air intake conduit is vertically below the flue gas vent conduit.
Figure 37:
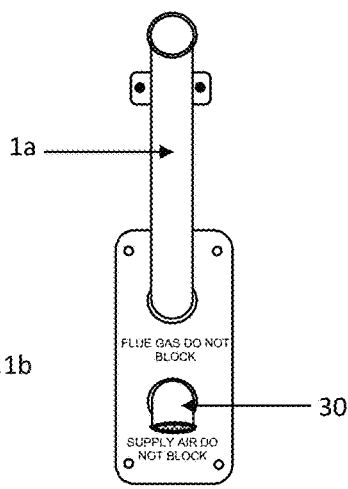
FIG. 37 is a front view of the vent terminations used as a flue gas vent conduit where a single 90 degree elbow fitting is vertically below the flue gas vent conduit.
Figure 38:
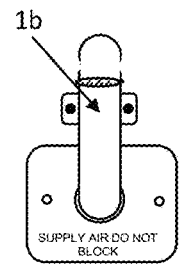
FIG. 38 is a front view of the vent termination used as a combustion air intake conduit.
Figure 39:
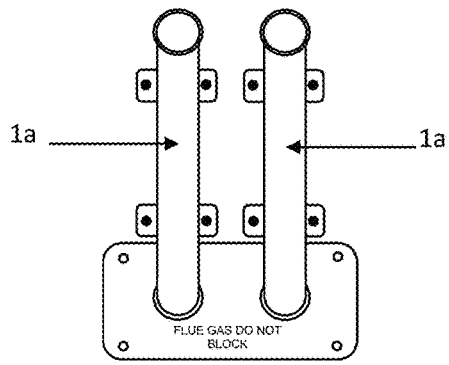
FIG. 39 is a front view of flue gas vent conduit vent terminals.
Figure 40:
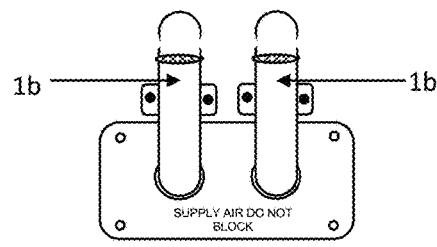
FIG. 40 is a front view of combustion air intake conduit vent terminals.

FIG. 33-39 provide illustration of vent terminations 1 described as either a flue gas vent conduit 1a or a combustion air intake conduit 1b and are not intended to limit the installations, as such, other configurations are possible. FIG. 33 provides illustration of a flue gas vent conduit 1a where entry to a building or structure is near the same elevation as the combustion air intake conduit 1b that is without the downward turn 3c as illustrated in FIG. 34. FIG. 35 provides illustration of a flue gas vent conduit 1a where the combustion air intake conduit 1b (FIG. 38) could appear at another location that is not in close proximity to the flue gas vent conduit 1a. FIG. 36 illustrates a flue gas vent conduit 1a installed vertically above a combustion air intake conduit 1b unlike FIG. 37 where the combustion air is conveyed through a combustion air intake 30 fitting elbow. FIG. 38 and FIG. 39 provide illustrations of similar flue gas vent conduits 1a or a combustion air intake conduits 1b in close proximity to one and other.

Figure 41:
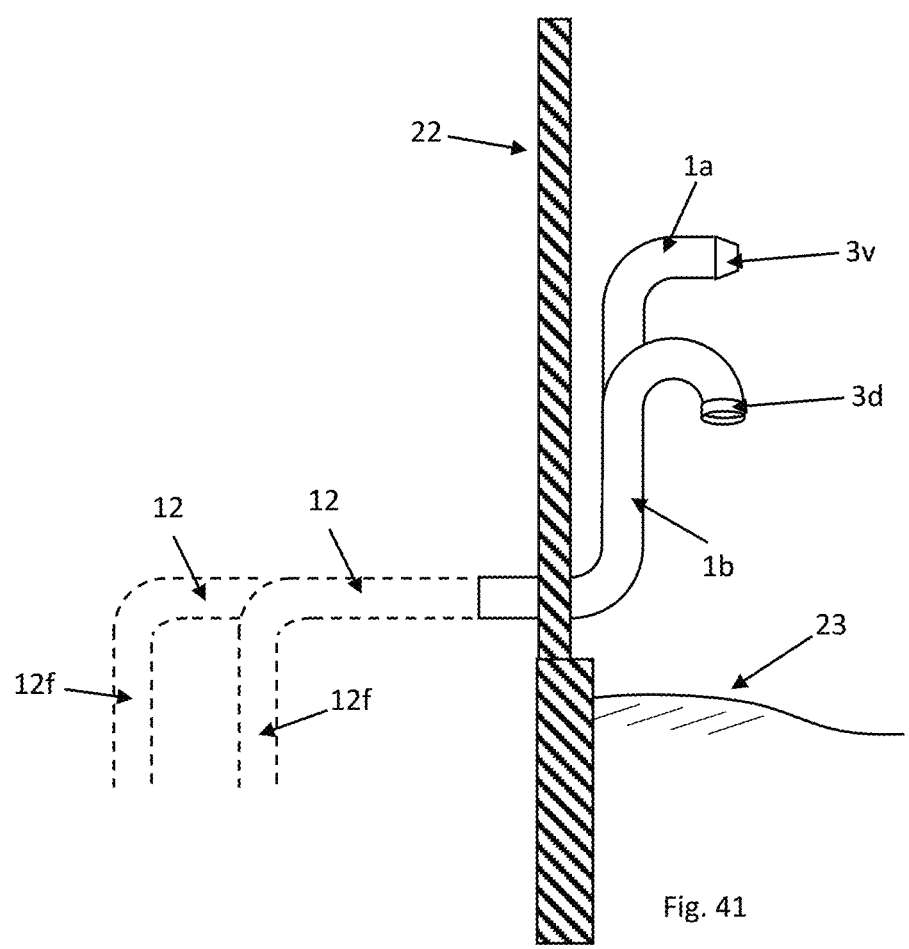
FIG. 41 is a side view of a combustion air intake conduit and a flue gas vent conduit where both the conduits connect to an appliance with conduits by others.

FIG. 41 illustrates two separate vent terminations 1 installed outside a building envelope described as a flue gas vent conduit 1a and a combustion air intake conduit 1b that are separate from one another and extend upward from grade 23 elevation. The vent terminations or flue gas vent conduit 1a and a combustion air intake conduit 1b are connected to an appliance with conduits by others 12 and vertically extending conduits 12f.

As described hereinbefore, in one aspect the present invention relates to a kit for forming an exterior fluidic duct to be fluidically communicated with an appliance located inside a structure through an opening formed in an exterior upright wall 22 of the structure, the kit comprising:

a mounting bracket 5 arranged for attaching on an exterior of said wall 22 of the structure at a location above said opening formed therein to define a fixed mounting location of the kit;

a tubular conduit 1 configured to convey gases to or from the appliance between opposite open ends of the conduit 1, wherein the conduit 1 is configured to be supported by the mounting bracket 5 in a generally vertical orientation in which one of the ends is disposed above the other end so as to define an upper end of the conduit 1 which is in fluidic communication with an external environment of the structure and a lower end of the conduit 1 to be arranged in fluidic communication with the appliance.

In at least one arrangement the conduit 1 comprises a linear portion arranged to span from a bottom end of the mounting bracket 5 arranged to be proximal to the opening in the structure to a top end of the mounting bracket 5 arranged to be distal thereto.

In at least one arrangement the conduit 1 comprises a linear portion extending along a substantially linear axis and an elbow portion formed integrally with the linear portion and defining the lower end of the conduit 1 which is arranged to pass through the opening in the structure to the inside, wherein the lower open end of the conduit 1 defined by the elbow portion encompasses an axis which forms a prescribed angle of at least 90 degrees with the axis of the linear portion. In at least one arrangement the angle is between about 100 degrees and about 125 degrees.

The kit further includes a complementary elbow fitting 12se which is distinct from the conduit 1, wherein the complementary elbow fitting 12se comprises opposite open ends encompassing axes which intersect at the prescribed angle for fluidically interconnecting a linearly extending interior conduit by others 12 which is fluidically connected to the elbow portion of the conduit 1 and a substantially vertically extending conduit 12f extending towards the appliance.

In at least one arrangement the kit further includes a screen assembly for substantially obstructing passage of solid matter or animals from the external environment and into the conduit 1 through the upper end thereof, wherein the screen assembly comprises an annular resilient carrier body 3d configured to be received in intimate relation over the upper end of the conduit 1 and defining an opening, and a screen member 3ds defining a plurality of openings configured to obstruct passage of the solid matter or animals therethrough, wherein the screen member 3ds spans across said opening of the carrier body 3d.

In at least one arrangement the carrier body 3d comprises a proximal side 3dt arranged to encompass the conduit 1 and a distal side 3du arranged to be spaced from the upper end of the conduit 1, the screen member 3ds being supported at an intermediate location between the proximal 3dt and distal sides 3du, and wherein the carrier body 3d is tapered in thickness, measured between an inner side arranged to engage the conduit 1 and an outer side opposite thereto arranged to be exposed to the external environment, from the distal side 3du to the proximal side 3dt such that the inner side is arranged to be substantially flush with an interior tubular surface at the upper end of the conduit 1.

In at least one arrangement the kit further includes a cover assembly for forming a seal between the opening in the structure and the conduit 1 arranged to pass therethrough, wherein the cover assembly includes a cover panel 34a arranged for attaching on the exterior of the wall 22 of the structure at a location coincident with the opening therein, wherein the cover panel 34a defines an opening to be communicated with the opening in the structure, said opening of the cover panel 34a being sized larger than an outer diameter of the conduit 1 to enable passage of the conduit 1 therethrough, and wherein the cover assembly includes an annular gasket 34g supported by the cover panel 34a within the opening thereof and configured to sealingly receive the conduit 1 therethrough.

In at least one arrangement the opening in the cover panel 34a is configured to be smaller than the opening in the structure.

In at least one arrangement the cover assembly further includes a gasket in the form of a pad 6ss with an opening therein which is in communication with the opening in the cover panel 34a, the pad 6ss being configured to be received intermediate the cover panel 34a and the wall 22 of the structure to form a substantially fluidically sealed interface therebetween.

In at least one arrangement the cover panel 34a defines a generally planar mounting face for facing the wall 22 of the structure and wherein the cover assembly further includes a tubular sleeve 34s configured to be received in the opening of the structure, the sleeve 34s supporting at one end thereof that is arranged to be located at or adjacent the exterior of the structure an outwardly extending annular flange 34f for providing a generally planar face to interface with the planar face of the cover panel 34a.

In at least one arrangement the cover panel 34a defines an outer face arranged to be exposed to the external environment that is configured to support a warning label 35 thereon.

In at least one arrangement the mounting bracket 5 is generally planar in shape so as to define a planar mounting surface for engaging the exterior wall 22 of the structure.

In at least one arrangement the mounting bracket 5 comprises a rigid body to which the conduit 1 is attachable and a pliable pad 6 coupled to the rigid body configured for engaging and conforming to a surface of the exterior wall 22 of the structure.

In at least one arrangement the pliable pad 6 is resilient.

In at least one arrangement the kit further includes a shield (FIG. 13) in form of a channel extending longitudinally from a top end to a bottom end which is open, wherein the shield is configured for attaching to the mounting bracket 5 outwardly of the conduit 1 so as to locate the conduit 1 in intermediate relation between the mounting bracket 5 and the shield.

In at least one arrangement (FIG. 13) the channel comprises a base wall 25 arranged to be in generally parallel and spaced relation to the exterior wall 22 of the structure and a pair of side walls 25b projecting from a common side of the base wall 25 in a manner which is arranged toward the exterior wall 22 of the structure, the base wall 25 defining an opening 29 for communicating with the conduit 1.

In at least one other arrangement the mounting bracket 5 is in the form of a channel extending longitudinally from a top end arranged to be distal to the opening in the structure to a bottom end arranged to be proximal to said opening and which is open, and wherein the channel is configured to surround the conduit 1 when mounted to the wall 22 of the structure, illustrated in FIG. 13.

In at least one arrangement the kit further includes a plurality of connectors distinct from the mounting bracket 5 and from the conduit 1, wherein each connector 9 extends from a first end 9a which is configured for coupling to the mounting bracket 5 to a second end 9b configured for coupling to the conduit 1 to support the conduit 1 in spaced relation to the mounting bracket 5, Illustrated in FIG. 10

In at least one arrangement the conduit 1 is configured to receive the connectors at locations which are spaced from each other in a longitudinal direction of the conduit 1 from one of the opposite ends to the other one of the opposite ends as illustrated in FIG. 1.

In at least one arrangement mating receptacles defined by the conduit 1 for receiving the second ends 9b of the connectors lie along a common line which is substantially vertically arranged in the generally vertical orientation of the conduit 1.

In at least one arrangement each mating receptacle is defined by a channel 11 extending along the common line and which is configured to slidably receive the second end 9b of a respective one of the connectors 9.

In at least one arrangement the first end 9a of each connector 9 is configured for generally-downward slidable insertion into mating receptacles defined by the mounting bracket 5.

In at least one arrangement the second ends 9b of the connectors 9 and the conduit 1 are configured for threadable mating.

In at least one arrangement mating receptacles defined by the conduit 1 for receiving the second ends 9b of the connectors 9 are thickened around openings defined thereby so as to resist transverse movement relative to longitudinal directions of the connectors 9 along which the connectors 9 extend from their first ends 9a to their second ends 9b.

In at least one arrangement, at least one of the first 9a and second ends 9b of the connectors 9 are flared so as to be configured for butting engagement with a corresponding one of the mounting bracket 5 and the conduit 1.

In at least one arrangement the kit further includes an accelerating nozzle 3v having a smaller inner diameter than an inner diameter of the conduit 1 and configured to be received in the upper end of the conduit 1 for accelerating the gases conveyed by the conduit 1 upon discharge therefrom to the external environment.

In at least one arrangement the conduit 1 is arranged to be supported in spaced relation to the mounting bracket 5.

In at least one arrangement the upper end of the conduit 1 which is arranged to open away from the exterior wall, and wherein there is provided a connector in the shape of a T 3*t* which is connectable at the upper end of the conduit 1 to provide a pair of oppositely vertically facing openings in fluidic communication with the conduit 1 but located either above 3*aa* or below 3*ab* the upper end thereof.

In at least one arrangement the conduit 1 comprises a linear portion extending along a substantially linear axis and a downward-turning upper portion 3*c* formed integrally with the linear portion and defining the upper end of the conduit 1, wherein the downward-turning upper portion 3*c* traverses a generally U-shaped path from the linear portion to the upper end of the conduit 1 such that the upper end of the conduit 1 defined by the downward-turning portion 3*c* is arranged to face downwardly in the generally vertical orientation of the conduit 1.

As described hereinbefore, in one aspect the present invention relates to a kit for forming an exterior fluidic duct to be fluidically communicated with an appliance located inside a structure through an opening formed in an exterior upright wall 22 of the structure, the kit comprising:

a tubular conduit 1 configured to convey gases to or from the appliance between opposite open ends of the conduit 1, wherein the conduit 1 is configured to be supported externally of the structure in a generally vertical orientation in which one of the ends is disposed above the other end so as to define an upper end of the conduit 1 which is in fluidic communication with an external environment of the structure and a lower end of the conduit 1 to be arranged in fluidic communication with the appliance;

and a cover assembly for forming a seal between the opening in the structure and the conduit 1 arranged to pass therethrough;

wherein the cover assembly includes a cover panel 34*a* arranged for attaching on the exterior of the wall 22 of the structure at a location coincident with the opening therein;

wherein the cover panel 34*a* defines an opening to be communicated with the opening in the structure, said opening of the cover panel 34*a* being sized larger than an outer diameter of the conduit 1 to enable passage of the conduit 1 therethrough;

and wherein the cover assembly includes an annular gasket 34*g* supported by the cover panel 34*a* within the opening thereof and configured to sealingly receive the conduit 1 therethrough.

As described hereinbefore, in one aspect the present invention relates to a kit for forming an exterior fluidic duct to be fluidically communicated with an appliance located inside a structure through an opening formed in an exterior upright wall 22 of the structure, the kit comprising:

a tubular conduit 1 configured to convey gases to or from the appliance between opposite open ends of the conduit 1, wherein the conduit 1 is configured to be supported externally of the structure in a generally vertical orientation in which one of the ends is disposed above the other end so as to define an upper end of the conduit 1 which is in fluidic communication with an external environment of the structure and a lower end of the conduit 1 to be arranged in fluidic communication with the appliance;

and a screen assembly for substantially obstructing passage of solid matter or animals from the external environment and into the conduit 1 through the upper end thereof;

wherein the screen assembly comprises an annular resilient carrier body 3*d* configured to be received in intimate relation over the upper end of the conduit 1 and defining an opening, and a screen member 3*ds* defining a plurality of openings arranged to obstruct passage of the solid matter or animals therethrough, wherein the screen member 3*ds* spans across said opening of the carrier body 3*d*.

As described hereinbefore, in one aspect the present invention relates to a method of forming a fluidic duct for fluidically communicating an appliance locating inside a structure through an opening formed in an exterior upright wall 22 of the structure, the method comprising:

mounting a conduit 1, which extends from a first open end to a second open end, in fixed relation to an exterior of the structure, wherein mounting the conduit 1 comprises passing one of the ends thereof through the opening in the structure to locate said end inside the structure;

and fluidically connecting the end of the conduit 1 located inside the structure to the appliance.

The present invention has been illustrated and described with reference to particular embodiments thereof, it will be understood by those skilled in the art that other changes in form and detail may be made and are to be considered within the scope and essence of the present invention.

The invention claimed is:

1. A kit for forming an exterior fluidic duct to be fluidically communicated with an appliance located inside a structure through an opening formed in an exterior upright wall of the structure, the kit comprising:
   a mounting bracket arranged for attaching on an exterior of said wall of the structure at a location above said opening formed therein to define a fixed mounting location of the kit;
   a tubular conduit configured to convey gases to or from the appliance between opposite open ends of the conduit, wherein the conduit is configured to be supported by the mounting bracket in a generally vertical orientation in which one of the ends is disposed above the other end so as to define an upper end of the conduit which is in fluidic communication with an external environment of the structure and a lower end of the conduit for fluidic communication with the appliance;
   wherein the conduit comprises a unitary length of piping spanning between the upper and lower ends;
   wherein the unitary length of piping comprises (i) a linear portion extending along a substantially linear axis, (ii) an upper portion integrally formed with the linear portion and defining the upper end of the conduit, and (iii) an elbow portion formed integrally with the linear portion and defining the lower end of the conduit which is arranged to pass through the opening in the structure to an inside thereof;
   wherein the lower open end of the conduit defined by the elbow portion encompasses an axis which forms a prescribed angle of at least 90 degrees with the axis of the linear portion; and
   wherein the upper portion extends along a path that turns away from the axis of the linear portion in an opposite direction to the elbow portion so as to turn away from the exterior wall of the building; and
   a shield in form of a channel extending longitudinally from a top end to an open bottom end, wherein the shield is configured for attaching to the mounting bracket outwardly of the conduit so as to locate the conduit in intermediate relation between the mounting bracket and the shield.

2. The kit of claim 1 wherein the linear portion is arranged to span a height of the mounting bracket from a bottom end of the mounting bracket arranged to be proximal to the opening in the structure to a top end of the mounting bracket arranged to be distal thereto.

3. The kit of claim 1 wherein the prescribed angle is between 100 degrees and 125 degrees.

4. The kit of claim 1 further including a complementary elbow fitting which is distinct from the conduit, wherein the complementary elbow fitting comprises opposite open ends encompassing axes which intersect at the prescribed angle for fluidically interconnecting a linearly extending interior conduit which is fluidically connected to the elbow portion of the conduit and a substantially vertically extending conduit extending towards the appliance.

5. The kit of claim 1 further including a screen assembly for substantially obstructing passage of solid matter or animals from the external environment and into the conduit through the upper end thereof, wherein the screen assembly comprises an annular resilient carrier body configured to be received over the upper end of the conduit and defining an opening, and a screen member defining a plurality of openings configured to obstruct passage of the solid matter or animals therethrough, wherein the screen member spans across said opening of the carrier body.

6. The kit of claim 5 wherein the carrier body comprises a proximal side arranged to encompass the conduit and a distal side arranged to be spaced from the upper end of the conduit, the screen member being supported at an intermediate location between the proximal and distal sides, and wherein the carrier body is tapered in thickness, measured between an inner side arranged to engage the conduit and an outer side opposite thereto arranged to be exposed to the external environment, from the distal side to the proximal side such that the inner side is arranged to be substantially flush with an interior tubular surface at the upper end of the conduit.

7. The kit of claim 1 further including a cover assembly for forming a seal between the opening in the structure and the conduit arranged to pass therethrough, wherein the cover assembly includes a cover panel arranged for attaching on the exterior of the wall of the structure at a location coincident with the opening therein, wherein the cover panel defines an opening to be communicated with the opening in the structure, said opening of the cover panel being sized larger than an outer diameter of the conduit to enable passage of the conduit therethrough, and wherein the cover assembly includes an annular gasket supported by the cover panel within the opening thereof and configured to sealingly receive the conduit therethrough.

8. The kit of claim 7 wherein the opening in the cover panel is configured to be smaller than the opening in the structure.

9. The kit of claim 7 wherein the cover assembly further includes a gasket in the form of a pad with an opening therein which is in communication with the opening in the cover panel, the pad being configured to be received intermediate the cover panel and the wall of the structure to form a substantially fluidically sealed interface therebetween.

10. The kit of claim 7 wherein the cover panel defines a generally planar mounting face for facing the wall of the structure and wherein the cover assembly further includes a tubular sleeve configured to be received in the opening of the structure, the sleeve supporting at one end thereof that is arranged to be located at or adjacent the exterior of the structure an outwardly extending annular flange for providing a generally planar face to interface with the planar face of the cover panel.

11. The kit of claim 7 wherein the cover panel defines an outer face arranged to be exposed to the external environment that is configured to support a warning label thereon.

12. The kit of claim 1 wherein the mounting bracket is generally planar in shape so as to define a planar mounting surface for engaging the exterior wall of the structure.

13. The kit of claim 1 wherein the mounting bracket comprises a rigid body to which the conduit is attachable and a pliable pad coupled to the rigid body configured for engaging and conforming to a surface of the exterior wall of the structure.

14. The kit of claim 13 wherein the pliable pad is resilient.

15. The kit of claim 1 wherein the channel comprises a base wall arranged to be in generally parallel and spaced relation to the exterior wall of the structure and a pair of side walls projecting from the base wall toward the exterior wall of the structure, the base wall defining an opening for communicating with the conduit.

16. The kit of claim 1 wherein the upper portion extends along a generally U-shaped path from the linear portion to the upper end of the conduit such that the upper end of the conduit is arranged to face downwardly in the generally vertical orientation of the conduit.

17. A kit for forming an exterior fluidic duct to be fluidically communicated with an appliance located inside a structure through an opening formed in an exterior upright wall of the structure, the kit comprising:
a mounting bracket arranged for attaching on an exterior of said wall of the structure at a location above said opening formed therein to define a fixed mounting location of the kit;
a tubular conduit configured to convey gases to or from the appliance between opposite open ends of the conduit, wherein the conduit is configured to be supported by the mounting bracket in a generally vertical orientation in which one of the ends is disposed above the other end so as to define an upper end of the conduit which is in fluidic communication with an external environment of the structure and a lower end of the conduit for fluidic communication with the appliance;
wherein the conduit comprises a unitary length of piping spanning between the upper and lower ends;
wherein the unitary length of piping comprises (i) a linear portion extending along a substantially linear axis, (ii) an upper portion integrally formed with the linear portion and defining the upper end of the conduit, and (iii) an elbow portion formed integrally with the linear portion and defining the lower end of the conduit which is arranged to pass through the opening in the structure to an inside thereof;
wherein the lower open end of the conduit defined by the elbow portion encompasses an axis which forms a prescribed angle of at least 90 degrees with the axis of the linear portion; and
wherein the upper portion extends along a path that turns away from the axis of the linear portion in an opposite direction to the elbow portion so as to turn away from the exterior wall of the building;
wherein the mounting bracket is in the form of a channel extending longitudinally from a top end arranged to be distal to the opening in the structure to an open bottom end arranged to be proximal to said opening, and wherein the channel is configured to surround the conduit when mounted to the wall of the structure.

18. The kit of claim 17 wherein the linear portion is arranged to span a height of the mounting bracket from a bottom end of the mounting bracket arranged to be proximal to the opening in the structure to a top end of the mounting bracket arranged to be distal thereto.

19. The kit of claim 17 wherein the prescribed angle is between 100 degrees and 125 degrees.

20. The kit of claim 19 further including a complementary elbow fitting which is distinct from the conduit, wherein the complementary elbow fitting comprises opposite open ends encompassing axes which intersect at the prescribed angle for fluidically interconnecting a linearly extending interior conduit which is fluidically connected to the elbow portion of the conduit and a substantially vertically extending conduit extending towards the appliance.

21. The kit of claim 17 wherein the mounting bracket is generally planar in shape so as to define a planar mounting surface for engaging the exterior wall of the structure.

22. A kit for forming an exterior fluidic duct to be fluidically communicated with an appliance located inside a structure through an opening formed in an exterior upright wall of the structure, the kit comprising:
- a mounting bracket arranged for attaching on an exterior of said wall of the structure at a location above said opening formed therein to define a fixed mounting location of the kit;
- a tubular conduit configured to convey gases to or from the appliance between opposite open ends of the conduit, wherein the conduit is configured to be supported by the mounting bracket in a generally vertical orientation in which one of the ends is disposed above the other end so as to define an upper end of the conduit which is in fluidic communication with an external environment of the structure and a lower end of the conduit for fluidic communication with the appliance;
- wherein the conduit comprises a unitary length of piping spanning between the upper and lower ends;
- wherein the unitary length of piping comprises (i) a linear portion extending along a substantially linear axis, (ii) an upper portion integrally formed with the linear portion and defining the upper end of the conduit, and (iii) an elbow portion formed integrally with the linear portion and defining the lower end of the conduit which is arranged to pass through the opening in the structure to an inside thereof;
- wherein the lower open end of the conduit defined by the elbow portion encompasses an axis which forms a prescribed angle of at least 90 degrees with the axis of the linear portion; and
- wherein the upper portion extends along a path that turns away from the axis of the linear portion in an opposite direction to the elbow portion so as to turn away from the exterior wall of the building; and
- a plurality of connectors distinct from the mounting bracket and from the conduit, wherein each connector extends from a first end which is configured for coupling to the mounting bracket to a second end configured for coupling to the conduit to support the conduit in spaced relation to the mounting bracket.

23. The kit of claim 22 wherein the conduit is configured to receive the connectors at locations which are spaced from each other in a longitudinal direction of the conduit from one of the opposite ends to the other one of the opposite ends.

24. The kit of claim 23 wherein mating receptacles defined by the conduit for receiving the second ends of the connectors lie along a common line which is substantially vertically arranged in the generally vertical orientation of the conduit.

25. The kit of claim 24 wherein each mating receptacle is defined by a channel extending along the common line and which is configured to slidably receive the second end of a respective one of the connectors.

26. The kit of claim 22 wherein the first end of each connector is configured for generally-downward slidable insertion into mating receptacles defined by the mounting bracket.

27. The kit of claim 22 wherein the second ends of the connectors and the conduit are configured for threadable mating.

28. The kit of claim 22 wherein mating receptacles defined by the conduit for receiving the second ends of the connectors are thickened around openings defined thereby so as to resist transverse movement relative to longitudinal directions of the connectors along which the connectors extend from the first ends to the second ends.

29. The kit of claim 22 wherein at least one of the first and second ends of the connectors are flared so as to be configured for butting engagement with a corresponding one of the mounting bracket and the conduit.

30. The kit of claim 22 wherein the linear portion is arranged to span a height of the mounting bracket from a bottom end of the mounting bracket arranged to be proximal to the opening in the structure to a top end of the mounting bracket arranged to be distal thereto.

31. The kit of claim 22 wherein the prescribed angle is between 100 degrees and 125 degrees.

32. The kit of claim 31 further including a complementary elbow fitting which is distinct from the conduit, wherein the complementary elbow fitting comprises opposite open ends encompassing axes which intersect at the prescribed angle for fluidically interconnecting a linearly extending interior conduit which is fluidically connected to the elbow portion of the conduit and a substantially vertically extending conduit extending towards the appliance.

33. The kit of claim 22 wherein the mounting bracket is generally planar in shape so as to define a planar mounting surface for engaging the exterior wall of the structure.

* * * * *